(12) United States Patent
Berta et al.

(10) Patent No.: US 8,652,705 B2
(45) Date of Patent: Feb. 18, 2014

(54) SOLID POLYMER ELECTROLYTE AND PROCESS FOR MAKING SAME

(75) Inventors: Thomas Berta, Wilmington, DE (US); William Shamrock, Newark, DE (US); Wen Liu, Newark, DE (US)

(73) Assignee: W.L. Gore & Associates, Inc., Newark, DE (US)

(*) Notice: Subject to any disclaimer, the term of this patent is extended or adjusted under 35 U.S.C. 154(b) by 2084 days.

(21) Appl. No.: 11/235,478

(22) Filed: Sep. 26, 2005

(65) Prior Publication Data

US 2007/0072036 A1 Mar. 29, 2007

(51) Int. Cl.
*H01M 8/10* (2006.01)

(52) U.S. Cl.
USPC .......................................... 429/491; 429/492

(58) Field of Classification Search
USPC ............................................................ 429/33
See application file for complete search history.

(56) References Cited

U.S. PATENT DOCUMENTS

| | | | |
|---|---|---|---|
| 3,497,389 A | 2/1970 | Berger et al. | 136/86 |
| 3,953,566 A | 4/1976 | Gore | |
| 4,959,132 A | 9/1990 | Fedkiw, Jr. | 204/101 |
| 5,200,278 A * | 4/1993 | Watkins et al. | 429/24 |
| 5,342,494 A | 8/1994 | Shane et al. | 204/252 |
| 5,472,799 A | 12/1995 | Watanabe | 429/30 |
| 5,547,551 A * | 8/1996 | Bahar et al. | 204/296 |
| 5,635,041 A | 6/1997 | Bahar | |
| 5,738,905 A * | 4/1998 | Bevers | 427/115 |
| 5,760,124 A | 6/1998 | Listigovers et al. | |
| 5,766,787 A | 6/1998 | Watanabe et al. | 429/33 |
| 5,800,938 A | 9/1998 | Watanabe | 429/30 |
| 5,843,519 A | 12/1998 | Tada | |
| 5,879,828 A | 3/1999 | Debe et al. | |
| 6,054,230 A * | 4/2000 | Kato | 429/33 |
| 6,221,332 B1 | 4/2001 | Thumm et al. | |

(Continued)

FOREIGN PATENT DOCUMENTS

| | | |
|---|---|---|
| AU | 1013703 | 12/1965 |
| DE | 43 33 328 A1 | 4/1994 |

(Continued)

OTHER PUBLICATIONS

Laconti, A. B., Fragala, A. R., & Boyack, J. R. 1977, "Solid Polymer Electrolyte Electrochemical Cells: Electrode and Other Material Considerations", Proceedings vol. 77-6 edn, J. D. E. McIntyre, S. Srinivasan, & F. G. Will, eds., The Electrochemical Society, Pennington, NJ, pp. 354-374.

(Continued)

*Primary Examiner* — Barbara Gilliam
*Assistant Examiner* — Adam A Arciero
(74) *Attorney, Agent, or Firm* — Allan M. Wheatcraft

(57) ABSTRACT

A solid polymer electrolyte membrane having a first surface and a second surface opposite the first surface, where the solid polymer electrolyte membrane has a failure force greater than about 115 grams and comprises a composite membrane consisting essentially of (a) at least one expanded PTFE membrane having a porous microstructure of polymeric fibrils, and (b) at least one ion exchange material impregnated throughout the porous microstructure of the expanded PTFE membrane so as to render an interior volume of the expanded PTFE membrane substantially occlusive; (c) at least one substantially occlusive, electronically insulating first composite layer interposed between the expanded PTFE membrane and the first surface, the first composite layer comprising a plurality of first carbon particles supporting a catalyst comprising platinum and an ion exchange material.

6 Claims, 11 Drawing Sheets

(56) References Cited

U.S. PATENT DOCUMENTS

| | | | |
|---|---|---|---|
| RE37,307 E | 8/2001 | Bahar et al. | |
| 6,335,112 B1 | 1/2002 | Asukabe et al. | 429/30 |
| RE37,656 E | 4/2002 | Bahar et al. | 204/282 |
| RE37,701 E | 5/2002 | Bahar et al. | 442/171 |
| 6,413,478 B1 | 7/2002 | Mabry et al. | |
| 6,425,993 B1 | 7/2002 | Debe et al. | |
| 6,630,263 B1 | 10/2003 | McElroy | 429/30 |
| 6,753,108 B1 | 6/2004 | Hampden-Smith et al. | |
| 6,824,909 B2 | 11/2004 | Mathias et al. | 429/33 |
| 6,855,660 B2 | 2/2005 | Tsou et al. | |
| 2002/0015875 A1 | 2/2002 | Kim | |
| 2002/0058172 A1 | 5/2002 | Datz et al. | 429/30 |
| 2002/0058179 A1 | 5/2002 | Segit et al. | |
| 2003/0008196 A1 | 1/2003 | Wessel et al. | 429/40 |
| 2003/0041444 A1 | 3/2003 | Debe | |
| 2003/0059666 A1 | 3/2003 | Kourtakis | |
| 2003/0114297 A1* | 6/2003 | Shinn et al. | 502/159 |
| 2003/0118884 A1 | 6/2003 | Hampden-Smith et al. | 429/30 |
| 2003/0198849 A1 | 10/2003 | Hampden-Smith et al. | 429/30 |
| 2004/0043283 A1 | 3/2004 | Cipollini et al. | 429/40 |
| 2004/0045814 A1 | 3/2004 | Bahar et al. | 204/58 |
| 2004/0096725 A1 | 5/2004 | Mao et al. | |
| 2004/0107869 A1 | 6/2004 | Velamakanni et al. | |
| 2004/0224216 A1 | 11/2004 | Burlatsky et al. | 429/58 |
| 2005/0095355 A1 | 5/2005 | Leistra et al. | 427/58 |
| 2005/0118478 A1 | 6/2005 | Kiefer et al. | |
| 2005/0136308 A1 | 6/2005 | Andrews et al. | 429/30 |
| 2005/0196661 A1 | 9/2005 | Burlatsky et al. | 429/58 |
| 2005/0227132 A1 | 10/2005 | Hori et al. | |
| 2005/0260464 A1 | 11/2005 | Raiford et al. | 429/13 |
| 2006/0019140 A1 | 1/2006 | Kawazoe et al. | 429/33 |
| 2006/0029850 A1 | 2/2006 | Szrama et al. | 429/30 |
| 2006/0046120 A1 | 3/2006 | Merzougui et al. | 429/30 |
| 2006/0063054 A1 | 3/2006 | Frey et al. | 429/33 |
| 2006/0063055 A1 | 3/2006 | Frey et al. | 429/33 |
| 2006/0099475 A1 | 5/2006 | Watanabe et al. | 429/33 |
| 2006/0166073 A1 | 7/2006 | Ohashi | 429/40 |
| 2006/0199062 A1* | 9/2006 | Yanagita et al. | 429/33 |
| 2010/0086675 A1 | 4/2010 | Berta et al. | |
| 2013/0196055 A1 | 8/2013 | Berta et al. | |

FOREIGN PATENT DOCUMENTS

| | | |
|---|---|---|
| EP | 0 309 337 A1 | 3/1989 |
| EP | 1 289 041 A2 | 5/2003 |
| EP | 1 496 561 | 1/2005 |
| GB | 1 534 359 | 12/1998 |
| JP | 6-103992 | 4/1994 |
| JP | 2001-118591 A | 4/2001 |
| JP | 2003-59507 | 2/2003 |
| JP | 2003-77492 A | 3/2003 |
| JP | 2003-123777 A | 4/2003 |
| JP | 2004-134269 | 4/2004 |
| JP | 2004-175997 A | 6/2004 |
| JP | 2005-149859 A | 6/2005 |
| JP | 2004-107914 | 4/2006 |
| JP | 2006-99999 A | 4/2006 |
| JP | 2006-107914 | 4/2006 |
| JP | 2006-351320 | 12/2006 |
| WO | WO 02/05375 | 1/2002 |
| WO | WO 2005/071779 A2 | 8/2005 |
| WO | WO 2006/006502 A1 | 1/2006 |
| WO | WO 2007/073500 A2 | 6/2007 |

OTHER PUBLICATIONS

Michas, A., Kelly, J. M., Durand, R., Pineri, M., & Coey, J. M. D. 1986, "Preparation, characterization and catalytic properties of perfluorosulfonated ion-exchange membranes containing surface-concentrated, hydrated ruthenium oxide particles", Journal of Membrane Science, vol. 29, No. 3, pp. 239-257.

Holdcroft, S. & Funt, B. L. 1988, "Preparation and electrocatalytic properties of conducting films of polypyrrole containing platinum microparticulates", Journal of Electroanalytical Chemistry, vol. 240, No. 1-2, pp. 89-103.

LaConti, A. B., Hamdan, M., & McDonald, R. C. 2003, "Mechanisms of membrane degradation," in Handbook of Fuel Cells—Fundamentals, Technology and Applications, vol. 3: Fuel Cell Technology and Applications edn, W. Vielstich, H. A. Gasteiger, & A. Lamm eds., John Wiley & Sons, Ltd, New York, NY, pp. 647-662.

Liu, F., Yi, B., Xing, D., Yu, J., Hou, Z., & Fu, Y. 2003, "Development of novel self-humidifying composite membranes for fuel cells", Journal of Power Sources, vol. 124, No. 1, pp. 81-89.

Page, K. A., Cable, K. M., & Moore, R. B. 2005, "Molecular origins of the thermal transitions and dynamic mechanical relaxations in perfluorosulfonate ionomers", Macromolecules, vol. 38, No. 15, pp. 6472-6484.

Wang, C; Liu, Z.X.; Mao, Z. Q.; Xu, J. M.; Ge, K. Y.; "Preparation and evaluation of a novel self-humidifying Pt/PFSA composite membrane for PEM fuel cell", Chemical Engineering Journal, vol. 112, No. 1-3, pp. 87-91.

Xing, Dan-min; Yi, Bao-lian; Fu, Yong-zhu; Liu, FuQiang,; Zhang, Hua-min; "Pt-C/SPEEK/PTFE self-humidifying composite membrane for fuel cells"Electrochimidal and Solid State Letters, 7 (10) A315-A317 (2004).

Hsue-Yang Liu and Fred C. Anson, "Redox Mediation of Dioxygen Reduction Within Nafion Electrode Coatings Containing Colloidal Platinum As Catalyst" Journal of Electroanalytical Chemistry, vol. 158, Issue 1 (Nov. 10, 1983) pp. 181-185.

Kingo Itaya, Hideyuki Takahashi and Isamu Uchida, "Electrodeposition of Pt Ultratmicroparticles in Nafion Films on Glassy Carbon Electrodes", Journal of Electroanalytical Chemistry, vol. 208 (1986) pp. 373-382.

Fuqiang Liu, Baolian Yi, Danmin Xing, Jingrong Us, Zhongjun Hou, Yongzhu Fu; "Development of novel self-humidifying composite membranes for fuel cells" Journal of Power Source 124 (2003) pp. 81-89.

European Search Report dated Jun. 15, 2012-EP 11 19 3223.

* cited by examiner

SOLID POLYMER ELECTROLYTE AND PROCESS FOR MAKING SAME

FIELD OF THE INVENTION

The present invention relates to a solid polymer electrolyte and process for making it, as well as its use in a catalyst coated membrane and in polymer electrolyte membrane fuel cells.

BACKGROUND OF THE INVENTION

Fuel cells are devices that convert fluid streams containing a fuel, for example hydrogen, and an oxidizing species, for example, oxygen or air, to electricity, heat and reaction products. Such devices comprise an anode, where the fuel is provided; a cathode, where the oxidizing species is provided; and an electrolyte separating the two. The anode-electrolyte-cathode body is called the catalyst coated membrane herein. The fuel and/or oxidant typically is a liquid or gaseous material. The electrolyte is an electronic insulator that separates the fuel and oxidant. It provides an ionic pathway for the ions to move between the anode, where the ions are produced by reaction of the fuel, to the cathode, where they are used to produce the product. The electrons produced during formation of the ions are used in an external circuit, thus producing electricity. As used herein, fuel cells may include a single cell comprising only one anode, one cathode and an electrolyte interposed therebetween, or multiple cells assembled in a stack. In the latter case there are multiple separate anode and cathode areas wherein each anode and cathode area is separated by an electrolyte. The individual anode and cathode areas in such a stack are each fed fuel and oxidant, respectively, and may be connected in any combination of series or parallel external connections to provide power.

Additional components in a single cell or in a fuel cell stack may optionally include means to distribute the reactants across the anode and cathode, including, but not limited to porous gas diffusion media. Various sealing materials used to prohibit mixing of the various species may also be used. As used herein, the membrane electrode assembly (MEA) comprises the catalyst coated membrane and such gas diffusion media and sealing materials. Additionally, so-called bipolar plates, which are plates with channels to distribute the reactant may also be present.

A Polymer Electrolyte Membrane Fuel Cell (PEMFC) is a type of fuel cell where the electrolyte is a polymer electrolyte. Other types of fuel cells include Solid Oxide Fuel Cells (SOFC), Molten Carbonate Fuel Cells (MCFC), Phosphoric Acid Fuel Cells (PAFC), etc. As with any electrochemical device that operates using fluid reactants, unique challenges exist for achieving both high performance and long operating times. In order to achieve high performance it is necessary to reduce the electrical and ionic resistance of components within the device. Recent advances in the polymer electrolyte membranes have enabled significant improvements in the power density of PEMFCs. Steady progress has been made in various other aspects including lowering Pt loading, extending membrane life, and achieving high performance at different operating conditions. However, many technical challenges are still ahead. One of them is for the membrane electrode assembly to meet the lifetime requirements for various potential applications. These range from hundreds of hours for portable applications to 5,000 hours or longer for automotive applications to 40,000 hours or longer in stationary applications.

Although all of the materials in the fuel cell may be subject to degradation during operation, the integrity and health of the membrane is particularly important. Should the membrane degrade during fuel cell operation, it tends to become thinner and weaker, thus making it more likely to develop holes or tears. Should this occur, the oxidizing gas and fuel may mix internally potentially leading to internal reactions. Because such an internal reactions may ultimately cause damage to the entire system, the fuel cell must be shut down. One well known approach to assessing the health of a membrane is to measure the amount of fluoride ions in the product water of the fuel cell. Higher values of this so-called fluoride release rate are indicative of more attack of the membrane, and therefore are associated with membranes that have lower durability. Correspondingly, lower fluoride release rates are indicative of a healthier membrane, one more likely to have longer life.

As is well known in the art, decreasing the thickness of the polymer electrolyte membrane can reduce the membrane ionic resistance, thus increasing fuel cell power density. However, reducing the membranes physical thickness can increase the susceptibility to damage from other device components leading to shorter cell lifetimes. Various improvements have been developed to mitigate this problem. For example, U.S. Pat. No. RE 37,307, U.S. Pat. No. RE37,701, US Application No. 2004/0045814 to Bahar et al., and U.S. Pat. No. 6,613, 203 to Hobson, et. al. show that a polymer electrolyte membrane reinforced with a fully impregnated microporous membrane has advantageous mechanical properties. Although this approach is successful in improving cell performance and increasing lifetimes, even longer life would be even more desirable.

Various approaches have been used in the art in further attempts to extend membrane life. Shortly after the development of polymer membranes, many practitioners realized that degradation of the membrane occurred through the generation of radical species, for example, peroxy or hydroxy radicals in or near the electrodes. These very active species attacked the polymer and chemically degraded it. Therefore, approaches to reduce or remove these radical species have been developed. For example, it was recognized in the '70 s, that "for applications where maximum performance and life are needed, the membrane is treated by depositing a small quantity of catalyst within the solid polymer electrolyte (SPE). The finely divided catalyst, which forms a discontinuous layer, decomposes the small quantity of potentially harmful peroxy degradation species. Also there is a more intimate electrode/electrolyte contact which leads to some performance improvement. The use of the catalyst within the SPE appears to increase membrane life by an order of magnitude compared to untreated material." [LaConti, et. al., Proceedings of the Symp. On Electrode Materials for Energy Conversion & Storage, McIntyre, JDE; Srinivasan, S; and Will, GG; (eds), The Electrochemcal Society, Vol. 77-6, 1977, pg. 354]. Various approaches to achieve such compositions were subsequently developed, for example U.S. Pat. No. 4,959,132 to Fedkiw, U.S. Pat. No. 5,342,494 to Shane, et. al., U.S. Pat. No. 5,472,799 to Watanabe et. al, and U.S. Pat. No. 5,800,938 also to Watanabe.

In '132 a process for producing an in situ metallic electrocatalytic film proximate the surface of a solid polymer electrolyte membrane to form a composite structure useful in promoting electrochemical reactions in fuel cells, sensors, chloralkali processes, dialysis, or electrochemical synthesis cells is described. The method comprises the steps of: loading metal ions into the ionomer matrix of a solid polymer electrolyte membrane to achieve a loading level of metal ions sufficient for forming an electronically coherent film of metal within the ionomer matrix, said metal ions being selected as those which will constitute the chemical composition of the electrocatalytic film; and exposing at least one face of the metal-ion-loaded membrane to a chemical reductant under controlled conditions of time and temperature sufficient to cause the metal ions in the membrane to diffuse towards the exposed face and to be reduced to the metal (O) state while within the membrane, and to produce in situ within the ionomer matrix of the membrane an electronically coherent porous film of metal located predominately within the membrane and near its surface, the electronically coherent film being comprised of metal particles in electrical contact with one another. Although the process described in '132 does describe a process to form an electrocatalytic film proximate the surface of a solid polymer electrolyte membrane, it is a porous film in the membrane, and therefore is less useful in reducing cross-over of hydrogen through the membrane. Furthermore, only unsupported electrocatalyst metal ions are described.

In '494, another method for forming a catalyst impregnated fluorocarbon ion exchange membrane is described. It comprises the steps of: (a) conditioning the ion exchange membrane by exchanging hydrogen ions in the membrane with replacement cations; (b) exchanging said replacement cations with platinum catalyst ions; (c) reducing said catalyst ions to platinum metal; (d) repeating steps "a" through "c" at least once to form a multiply impregnated membrane; and (e) exchanging any remaining replacement cations in said multiply impregnated membrane with hydrogen and (f) equilibrating said multiply impregnated membrane wherein the platinum metal is present in the form of discrete and isolated particles within the membrane. This patent involves multiple complex steps, and produces discrete and isolated platinum metal particles that are not supported.

In '799, a solid polymer electrolyte fuel cell is described. It comprises a cathode current collector, a cathode connected to the cathode current collector, an ion exchange membrane having a catalyst layer; an anode and an anode current collector connected to the anode, the catalyst layer being electronically insulated from the current collectors. This catalyst layer is produced by dipping in an aqueous solution of a platinum amino salt to ion-exchange the exchange groups of the ion exchange resin in the electrodes with the platinum cation, and then the catalyst metal is supported in the vicinity of the surface by reducing the platinum ion by means of such a reducing agent as hydrazine. [col 1, lns. 62-67]. Only unsupported platinum metal catalysts are described, and the catalyst layer is separated from the cathode by an intervening layer of ion exchange membrane [FIG. 2]. In a later issued patents, U.S. Pat. No. 5,766,787 to the same author, a solid polymer composition comprising solid polymer electrolyte selected from cation exchange resin and anion exchange resin, and 0.01 to 80% in weight of at least one metal catalyst selected from the group consisting of platinum, gold, palladium, rhodium, iridium and ruthenium based on the weight of the solid polymer electrolyte contained in the said solid polymer electrolyte is claimed. This patent also only describes unsupported precious metal catalysts in the solid polymer electrolyte, and discloses a similar process as used in '799 to produce them.

In '938, a sandwich-type solid polymer electrolyte fuel cell is claimed. In this patent, a platinum layer (i.e. reaction catalyst layer, 7 in FIG. 2 of '938) was formed by means of sputtering onto a hydrocarbon ion exchange membrane on the anode side having a thickness of 50 microns and an EW value of 900. A commercially available perfluorocarbon-type ion exchange resin solution ("Nafion" solution) was applied on the catalyst layer on the anode side of the ion exchange membrane and dried at 60 degrees C. to form an ion exchange membrane having a catalyst layer whose total thickness was 60 microns [col. 6, lns. 42-52]. Additionally, it is disclosed that a catalyst metal particle (29 in FIG. 4 of '938) can be present in the ion exchange resin (27 or FIG. 4 of '938) of the cathode (24 of FIG. 4 of '938). The latter embodiment (FIG. 4 of '938) only has unsupported metal catalyst particles in the cathode, while the former embodiment (FIG. 2 of '938) discloses only unsupported metal catalyst particles in a layer separated from the cathode by an ion exchange resin (8 in FIG. 2 of '938).

A similar approach is disclosed in U.S. Pat. No. 6,630,263 to McElroy et. al. In this patent, a fuel cell is described, comprising: a cathode flow field plate; an anode flow field plate; an anode catalyst; a cathode catalyst; and a proton exchange membrane. The proton exchange membrane, comprises a catalyst material; and a proton exchange material, wherein the catalyst material is incorporated in the proton exchange material, the cathode catalyst is between the proton exchange membrane and the cathode flow field plate, the proton exchange membrane is between the cathode and anode catalysts, and a planar area of the cathode catalyst is from about 90% to about 99.9% of a planar area of the anode catalyst. In this application, the catalyst material is "a metal or an alloy, such as platinum or platinum containing alloy" [Col 4, line 61-62], and the importance of using a cathode catalyst area smaller than the anode catalyst area is taught. The concept of using a supported catalyst is not disclosed. Although the use of a reinforcement in the proton exchange membrane is disclosed [FIG. 4], the importance of a strong solid polymer electrolyte in combination with the presence of a supported catalyst in the solid polymer electrolyte is not described.

In yet another similar approach U.S. Patent Application 20050175886 to Fukuda, et. al. describes a process for producing an active solid polymer electrolyte membrane comprising: immersing an electrolyte membrane element into a mixture of a noble metal complex solution and at least one additive selected from a water-soluble organic solvent, a non-ionic surfactant and a non-metallic base to conduct an ion-exchanging; washing the electrolyte membrane element with pure water; subjecting the electrolyte membrane element to a reducing treatment; washing the electrolyte membrane element with pure water; and drying the electrolyte membrane element; wherein the active solid polymer electrolyte membrane comprises a solid polymer electrolyte element, and a plurality of noble metal catalyst grains which are carried by an ion exchange in a surface layer located inside a surface of said solid polymer electrolyte element and which are dispersed uniformly in the entire surface layer, said surface layer having a thickness $t_2$ equal to or smaller than 10 microns, wherein an amount CA of noble metal catalyst grains carried is in a range of $0.02$ mg/cm$^2 \leq CA \leq 0.14$ mg/cm$^2$. The method described in '886 the surface layer as "noble metal catalyst grains" [col 2, ln. 1]. Further, the method embodied in the claims is not capable of producing supported catalysts, which are present within the current invention.

In addition to the approaches described above, others have described alternative approaches to modifying the membrane in solid polymer electrolyte fuel cells. These include U.S. Pat. No. 6,335,442 to Asukabe, et. al., JP 2001-118591 to Morimoto, et. al., US Patent Application 2003/0008196 to Wessel, et. al., and European Patent Application EP 1289041 A2 to Iwassaki et. al, In these applications, solid polymer electrolytes comprising various alternatives to precious metal catalysts are claimed. For example, in '442 a solid polymer electrolyte membrane comprising oxide catalysts and macrocyclic metal complex catalysts is claimed. Similarly, in JP2001-118591 transition-metal oxides are disclosed as useful catalysts in solid-state polyelectrolytes; in '0008196 salts, oxides or organometallic complexes of group 4 elements are claimed; while in EP 1289041 antioxidants containing trivalent phosphorus or sulfer are suggested. In none of these cases is the formation of a layer in the solid polymer electrolyte of supported precious metal catalyst disclosed, nor is the importance of the mechanical properties of the membrane.

More recently, additional art in US Patent Application 2004/0043283 to Cippollini, et al.; US Patent Application No. 2004/0095355 to Leistra, et. al.; and US Patent Applications 2004/0224216 and 2005/0196661 to Burlatsky et. al. has published. In '43283, a membrane electrode assembly, comprising: an anode including a hydrogen oxidation catalyst; a cathode; a membrane disposed between said anode and said cathode; and a peroxide decomposition catalyst positioned in at least one position selected from the group consisting of said anode, said cathode, a layer between said anode and said membrane and a layer between said cathode and said membrane, wherein said peroxide decomposition catalyst has selectivity when exposed to hydrogen peroxide toward reactions which form benign products from said hydrogen peroxide. In '95355 a method for making membrane electrode assemblies such as those described in '43283 is claimed. In '224216, a membrane electrode assembly, comprising: an anode; a cathode; a membrane disposed between the anode and the cathode; and an extended catalyzed layer between the membrane and at least one electrode of the anode and the cathode, the extended catalyzed layer comprising catalyst particles embedded in membrane material and including a plurality of particles which are electrically connected to the at least one electrode. Similarly, in '196661, a membrane electrode assembly, comprising: an anode; a cathode; a membrane disposed between the anode and the cathode; and an extended catalyzed layer between the cathode and the membrane, the extended catalyzed layer being adapted to reduce oxygen, and decompose hydrogen peroxide and free radicals to produce water.

In all four of these applications, a peroxide decomposition catalyst is present, and that catalyst either "has selectivity when exposed to hydrogen peroxide" ('95355 e.g., claims 1, 25, and Paragraphs 8; and '43283, e.g., claims 1, 10, 26, 33 and Paragraphs 8, 9 &10) or is "electrically connected to cathode" '(196661, Paragraph 23) or "to at least one electrode" ('224216, Paragraph 10). In all four cases, the layer is shown as part of an extended electrode (e.g., FIG. 1a in '224216, FIG. 4 in '95355 and '43283 and FIG. 3 in '196661). In '95355 and '43283 the peroxide decomposition catalyst may also be disposed in a separate layer (70 in FIG. 6 in '95355 and '43283) by being dispersed through the layer. In this case though, the membrane is homogeneous outside of dispersed peroxide decomposition catalyst layer, (as shown in FIG. 6 in '95355 and '43283). Further, the critically important role of the mechanical properties of the membrane discovered herein is not disclosed, nor are any specific characteristics of the dispersed peroxide decomposition catalyst disclosed.

Additional related art has focused on hydrating the membrane through the use of various solid particles is given by U.S. Pat. No. 5,203,978 to Tsou, et al.; and to Mathias et. al., in U.S. Pat. No. 6,824,909. In each of these an inorganic particle such as a boride, carbide or nitride of a Groups IIIB, IVA, IVB, VB, and VIB metal ('978) or a zeolite ('909) is present. In '978 no catalyst is present, while in '909 a catalyst is present, but only on "adsorbent particles embedded in the membrane which adsorb water under wet conditions" [col. 2, ln. 8-10]. Non-absorbing particles, for example carbon, are not considered described.

In JP 2003-123777 to Takabe, et. al., a polymer electrolyte fuel cell comprising a hydrogen ion conductive polymer electrolyte membrane, and a pair of separators having gas flow channels whereby fuel gas is supplied to and discharged from one of the electrodes, and antioxidant gas is supplied to and discharged from the other, wherein said fuel cell is characterized in that the electrodes are provided with catalyst layers in contact with the hydrogen ion conductive polymer electrolyte membrane, and at least one of the catalyst layers of the electrodes has a hydrogen ion conductive polymer electrolyte, electroconductive carbon particles that support the catalyst particles, and a peroxide decomposition catalyst is claimed. In the specification and working examples of '123777, the inventors emphasize the importance of electrical isolation of the peroxide decomposition catalyst from the electrode. For example, "it is also effective to electronically insulate the space between the peroxide decomposition catalyst and the electrodes." (Paragraph 14), and "it is also effective for the peroxide decomposition catalyst to be supported on electrically insulating particles. (also Paragraph 14]". In fact, the inventors in '123777 go to great lengths to provide an electrically isolated peroxide decomposition catalyst, for example by mixing Pt/carbon catalyst with an ionomer solution followed by drying, hardening, and crushing of the mixture (Working Example 1). We have discovered, surprisingly, that such electrical isolation is not required to extend life and reduce degradation of solid polymer electrolytes. In this application, as described more fully below, a substantially occlusive, electronically insulating composite layer is present, but the individual catalyst on supporting particles do not need to be electrically isolated from the electrode as taught by Takabe, et. al. In fact, carbon support particles, which are electrically conductive, are effective in the instant invention of this application without the additional treatments required by Takabe et. al. as described in his Working Example 1.

During normal operation of a fuel cell or stack the power density typically decreases as the operation time goes up. This decrease, described by various practitioners as voltage decay, fuel cell durability, or fuel cell stability, is not desirable because less useful work is obtained as the cell ages during use. Ultimately, the cell or stack will eventually produce so little power that it is no longer useful at all. Furthermore, during operation the amount of fuel (e.g., hydrogen) that crosses over from the fuel side to the oxidizing side of the cell will increase as the health of the membrane deteriorates. In this application, this hydrogen cross-over will be used to determine membrane life.

A life test is generally performed under a given set of operating conditions for a fixed period of time. The test is performed under a known temperature, relative humidity, flow rate and pressure of inlet gases, and is done either in fixing the current or the voltage. In this application, the life tests are performed under constant current conditions, though it is well known in the art that constant voltage life tests will also produce decay in the power output of a cell. Herein, life is determined by temporarily stopping a life test, i.e., removing the cell from external load, and then determining the level of hydrogen cross-over in the cell. If the hydrogen cross-over is above some predetermined level, 2.5 $cm^3H_2$/min is used herein, then the test is ended, and the life is calculated as the number of hours the cell has operated. (Specific details of the test protocol used herein for life determination are described below).

Although there have been many improvements to fuel cells in an effort to improve life of fuel cells, there continues to be an unmet need for even more durable fuel cells, and in particular, more durable membrane materials for use in PEMFCs.

SUMMARY OF THE INVENTION

The instant invention of this application includes a solid polymer electrolyte membrane having a first surface and a second surface opposite the first surface, where the solid polymer electrolyte membrane has a failure force greater than about 115 grams and comprises a composite membrane consisting essentially of (a) at least one expanded PTFE membrane having a porous microstructure of polymeric fibrils, and (b) at least one ion exchange material impregnated throughout the porous microstructure of the expanded PTFE membrane so as to render an interior volume of the expanded PTFE membrane substantially occlusive; (c) at least one substantially occlusive, electronically insulating first composite layer interposed between the expanded PTFE membrane and the first surface, the first composite layer comprising a plurality of first carbon particles supporting a catalyst comprising platinum and an ion exchange material, wherein a plurality of the first carbon particles has a particle size less than about 75 nm, or less than about 50 nm, or less than about 25 nm. Optionally, this solid polymer electrolyte may also include at least one substantially occlusive, electronically insulating second layer interposed between the expanded PTFE membrane and one of the group consisting of the first surface, the second surface and a surface of the substantially occlusive, electronically insulating first composite layer, where the substantially occlusive, electronically insulating second layer is selected from the group of an ion exchange material, and a solid dispersion comprising a plurality of second carbon particles supporting a catalyst comprising platinum and an ion exchange material, wherein a plurality of the second carbon particles has a particle size less than about 75 nm, less than about 50 nm or less than about 25 nm.

An alternate embodiment of the invention is a solid polymer electrolyte membrane having a first surface and a second surface opposite the first surface, where the solid polymer electrolyte membrane has a failure force greater than about 115 grams and comprises a composite membrane consisting essentially of (a) at least one expanded PTFE membrane having a porous microstructure of polymeric fibrils, and (b) a solid dispersion comprising a plurality of first carbon particles supporting a catalyst comprising platinum and at least one ion exchange material, wherein a plurality of the carbon particles has a particle size less than about 75 nm, less than about 50 nm or less than about 25 nm; and this solid dispersion is impregnated throughout the porous microstructure of the expanded PTFE membrane so as to render an interior volume of the expanded PTFE membrane substantially occlusive. Optionally, the solid polymer electrolyte may also include at least one substantially occlusive, electronically insulating layer interposed between the expanded PTFE membrane and either the first surface or the second surface, where the substantially occlusive, electronically insulating layer is selected from the group of an ion exchange material, and a solid dispersion comprising a plurality of second carbon particles supporting a catalyst comprising platinum and an ion exchange material, wherein a plurality of the second carbon particles has a particle size less than about 75 nm, less than about 50 nm or less than about 25 nm.

In another embodiment, the invention includes a solid polymer electrolyte membrane having a first surface and a second surface opposite the first surface, where the solid polymer electrolyte membrane has a modulus greater than about $1.75 \times 10^6$ g/cm2 and a thickness of less than about 50 microns, and comprises a composite membrane consisting essentially of (a) at least one expanded PTFE membrane having a porous microstructure of polymeric fibrils, and (b) at least one ion exchange material impregnated throughout the porous microstructure of the expanded PTFE membrane so as to render an interior volume of the expanded PTFE membrane substantially occlusive; (c) at least one substantially occlusive, electronically insulating first composite layer interposed between the expanded PTFE membrane and the first surface, where this first composite layer comprises a plurality of first carbon particles supporting a catalyst comprising platinum and an ion exchange material, wherein a plurality of the first carbon particles has a particle size less than about 75 nm, less than about 50 nm or less than about 25 nm. Optionally, the solid polymer electrolyte may also include at least one substantially occlusive, electronically insulating second layer interposed between the expanded PTFE membrane and one of the group consisting of the first surface, the second surface and a surface of the substantially occlusive, electronically insulating first composite layer, where the substantially occlusive, electronically insulating second layer is selected from the group of an ion exchange material, and a solid dispersion comprising a plurality of second carbon particles supporting a catalyst comprising platinum and an ion exchange material, and a plurality of the second carbon particles has a particle size less than about 75 nm, less than about 50 nm or less than about 25 nm.

In another embodiment, the invention includes a solid polymer electrolyte membrane, where the solid polymer electrolyte membrane has a modulus greater than about $1.75 \times 10^6$ g/cm2 and a thickness of less than about 50 microns, and comprises a composite membrane consisting essentially of (a) at least one expanded PTFE membrane having a porous microstructure of polymeric fibrils, and (b) a solid dispersion comprising a plurality of first carbon particles supporting a catalyst comprising platinum and at least one ion exchange material, wherein a plurality of the carbon particles has a particle size less than about 75 nm, less than about 50 nm or less than about 25 nm; and the solid dispersion is impregnated throughout the porous microstructure of the expanded PTFE membrane so as to render an interior volume of the expanded PTFE membrane substantially occlusive. Alternatively, the solid polymer electrolyte of this embodiment may also include at least one substantially occlusive, electronically insulating layer is interposed between the expanded PTFE membrane and either the first surface or the second surface, where the substantially occlusive, electronically insulating layer is selected from the group of an ion exchange material, and a solid dispersion comprising a plurality of second carbon particles supporting a catalyst comprising platinum and an ion exchange material, wherein a plurality of the second carbon particles has a particle size less than about 75 nm, less than 50 nm or less than 25 nm.

In another embodiment of the invention, a solid polymer electrolyte membrane has a first surface, and the solid polymer electrolyte membrane has a failure force greater than about 115 grams, and a thickness less than about 40 microns. It comprises (a) an ion exchange material and (b) a plurality of particles supporting a catalyst, where the particles are dispersed in a substantially air occlusive, electronically insulating layer adjacent to the first surface, and a plurality of the particles supporting a catalyst have a size less than about 75 nm, less than 50 nm or less than 25 nm. Further, the solid polymer electrolyte may also have the microporous polymer membrane interposed between the electronically insulating layer and a second surface opposite the first surface. The catalyst in this embodiment may comprise a precious metal, or it may comprise platinum; the particle supporting the catalyst may comprise carbon, the solid polymer electrolyte may further comprises a microporous polymer membrane, including but not limited to polytetrafluoroethylene or expanded polytetrafluoroethylene. The concentration of the catalyst may be less than about 5 weight percent of the ion exchange material, less than about 3 weight percent, less than about 1 weight percent or about 1 weight percent of the ion exchange material. Additional embodiments include any of the solid polymer electrolyte as described in this paragraph wherein a plurality of the catalyst particles has a size between about 1 nm and about 15 nm in size.

Yet more embodiments of the invention include catalyst coated membranes that comprise (a) an anode comprising a catalyst for oxidizing fuel, (b) a cathode comprising a catalyst for reducing an oxidant, and a (c) a solid polymer electrolyte interposed between the anode and the cathode, where the solid polymer electrolytes comprise any of the solid polymer electrolytes described in the proceeding five paragraphs.

Further embodiments of the invention include fuel cells comprising any of the catalyst coated membrane described in the proceeding paragraph wherein sufficient fuel is supplied to the anode and sufficient oxidant is supplied to the cathode of the catalyst coated membrane to establish a voltage between the anode and the cathode when the anode and cathode are electrically connected through an external load.

Yet another embodiment of the invention is a method to prepare an air occlusive integral composite membrane that comprises the steps of (a) preparing an ink solution comprising a precious metal catalyst on a supporting particle and an ion exchange material; (b) providing a polymeric support having a microstructure of micropores; (c) applying either the ink solution or a solution comprising an ion exchange resin to the polymeric support; (d) optionally, repeating step (c); wherein at least one application in step (c) or (d) uses the ink solution. The concentration of the precious metal catalyst based on weight percent of dry ion exchange material may be between about 0.1% and 10%, between about 0.5% and 3%, about 2.5%, or about 1%. Further, step (a) may further include step (a1), a step to reduce the concentration of large particles in the ink. Such a step may comprise filtering, or the use of a centrifuge. Step (a) may also comprise the use of a high shear mixer to prepare the ink solution, and the high shear mixer may be a microfluidizers, or a rotor-stator mixers comprising at least one stage. When the high shear mixer is a microfluidizer it may operate at a pressure between about 1,000 and about 25,000 psi. The supporting particle may comprises carbon in the method; the precious metal catalyst may comprises platinum; and the polymer support may comprises polytetrafluoroethylene or expanded polytetrafluoroethylene.

Further embodiments of the inventive method include the method described in the proceeding paragraph wherein step (c) further includes, (c1) applying the ink solution to a thin polymer film and (c2) applying the polymer support having a microstructure of micropores to the ink solution on the thin polymer film. The thin polymer film comprises polyethylene, polyethylene terephthalate polypropylene, poly vinylidene chloride, polytetrafluoroethylene, polyesters, or combinations thereof. It may also comprise a coating capable of enhancing the release characteristics of the polymer film.

Yet additional embodiments of the inventive method include methods wherein step (c) further includes, a step, step (c3), of drying the support after each application of ion exchange material solution to remove solvent from the solution; methods wherein there is a further step after step (d) of heating the air occlusive integral composite membrane at an elevated temperature; methods wherein the elevated temperature is between about 100 degrees C. and about 175 degrees C., between about 120 degrees C. and about 160 degrees C.; and methods wherein the air occlusive integral composite membrane is held at the elevated temperature for between about 1 minute and about 10 minutes, or between about 0.3 minutes and about 5 minutes.

Yet more embodiments of the invention include a solid polymer electrolyte membrane having a first surface and a second surface opposite the first surface, where the solid polymer electrolyte membrane has a failure force greater than about 115 grams and comprises a composite membrane consisting essentially of (a) at least one expanded PTFE membrane having a porous microstructure of polymeric fibrils, and (b) at least one ion exchange material impregnated throughout the porous microstructure of the expanded PTFE membrane so as to render an interior volume of the expanded PTFE membrane substantially occlusive; (c) at least one substantially occlusive, electronically insulating first composite layer interposed between the expanded PTFE membrane and the first surface, where the first composite layer comprises a plurality of first particles supporting a catalyst comprising a precious metal and an ion exchange material, wherein a plurality of the first particles has a particle size less than about 75 nm, less than about 50 nm or less than about 25 nm. Optionally, the solid polymer electrolyte may also include at least one substantially occlusive, electronically insulating second layer interposed between the expanded PTFE membrane and one of the group consisting of the first surface, the second surface and a surface of the substantially occlusive, electronically insulating first composite layer, where the substantially occlusive, electronically insulating second layer selected from the group of an ion exchange material, and a solid dispersion comprising a plurality of second support particles supporting a catalyst comprising a precious metal and an ion exchange material, wherein a plurality of the second particles has a particle size less than about 75 nm, less than about 50 nm or less than about 25 nm. In this embodiment, the first and second particles may be selected from the group consisting of silica; zeolites; and oxides and carbides of the group IVB, VB, VIB VIIB, and VIII transition metals; and combinations thereof; the precious metal may be selected from the group consisting essentially of platinum, gold, palladium, rhodium, iridium, ruthenium and combinations thereof.

In yet another embodiment of the invention, a solid polymer electrolyte comprises an ion exchange material; and a plurality of catalyst particles on a plurality of support particles; wherein a first interparticle spacing between the support particles is less than about 600 nm. In this embodiment the first interparticle spacing may be less than about 450 nm, less than 300 nm, or less than 150 nm. Additionally, the solid polymer electrolyte may have a second interparticle spacing between the catalyst particles of less than about 50 nm, less than about 30 nm, or less than about 12 nm. In that case, the catalyst material may comprise a precious metal, the concentration of the catalyst may be less than or equal to about 5% by dry weight of the ion exchange material, less than or equal to about 3% by dry weight of the ion exchange material, less than or equal to about 1% by dry weight of the ion exchange material, or about 1% by dry weight of the ion exchange material. The precious metal may be selected from the group consisting essentially of gold, palladium, rhodium, iridium, ruthenium and combinations thereof, or it may comprises platinum. In either the case when the precious metal comprises carbon or when it is selected from the enumerated list, the support particle may be selected from the group consisting essentially of silica; zeolites; and oxides and carbides of the group IVB, VB, VIB VIIB, and VIII transition metals; and combinations thereof; or it may comprise carbon. Further, the support particle may have a size less than about 40 nm, or a size less than about 5 nm.

Another embodiment is a solid polymer electrolyte comprising an ion exchange material; and a plurality of catalyst particles on a plurality of support particles; wherein an interparticle spacing between the catalyst particles is less than about 50 nm, less than about 30 nm or less than about 12 nm. The catalyst material may comprises a precious metal, the concentration of the catalyst may be less than or equal to about 5% by dry weight of the ion exchange material, less than or equal to about 3%, equal to about 2.5%, or equal to about 1% by dry weight of the ion exchange material. The precious metal may be selected from the group consisting essentially of gold, palladium, rhodium, iridium, ruthenium and combinations thereof, or it may comprise platinum. In either case the support particle may be selected from the group consisting essentially of silica; zeolites; and oxides and carbides of the group IVB, VB, VIB VIIB, and VIII transition metals; and combinations thereof, or it may comprise carbon.

Additional embodiments of the invention include a catalyst coated membrane comprising (a) an anode comprising a catalyst for oxidizing fuel, (b) a cathode comprising a catalyst for reducing an oxidant, and a (c) a solid polymer electrolyte interposed between the anode and the cathode, where the solid polymer electrolyte comprises any of those described in the proceeding three paragraphs.

Yet more embodiments of the invention include fuel cells comprising the catalyst coated membranes of the proceeding paragraph wherein sufficient fuel is supplied to the anode and sufficient oxidant is supplied to the cathode to establish a voltage between the anode and the cathode when the anode and the cathode are electrically connected through an external load.

DESCRIPTION OF THE DRAWINGS

The operation of the present invention should become apparent from the following description when considered in conjunction with the accompanying figure.

DETAILED DESCRIPTION OF THE INVENTION

In order to develop membranes that have a long-life in a fuel cell, the mechanisms of failure need to be understood. Without being held to any particular theory, it is known in the art that there are two major forms of membrane failure, chemical and mechanical. The latter has been addressed by various approaches, for example by the formation of composite membranes described by Bahar et al. in RE 37,707. Approaches to address the former have also been proposed, for example in GB 1,210,794 assigned to E. I. Du Pont de Nemours, Inc., where a chemical process to stabilize ionomers was described. Degradation, as observed by the concentration of fluoride ions in various ex-situ or in-situ fuel cell tests, can thus be reduced.

The present invention involves a process for making, and a composition of, solid polymer electrolytes that is capable of reducing electrolyte degradation as observed by fluoride release rates from operating fuel cells. Inventors have discovered a composition of solid polymer electrolyte (SPE) that surprisingly reduces membrane degradation as observed by fluoride release rates, and gives a concomitant increase in membrane life. Inventors have discovered that when a plurality of very small particles (for example, less than about 75 nm) that are supporting a catalyst is dispersed in a substantially air occlusive, electronically insulating layer, preferably in an SPE that has high strength, unexpectedly long life is observed when the SPE is tested in a fuel cell.

Figure 1:
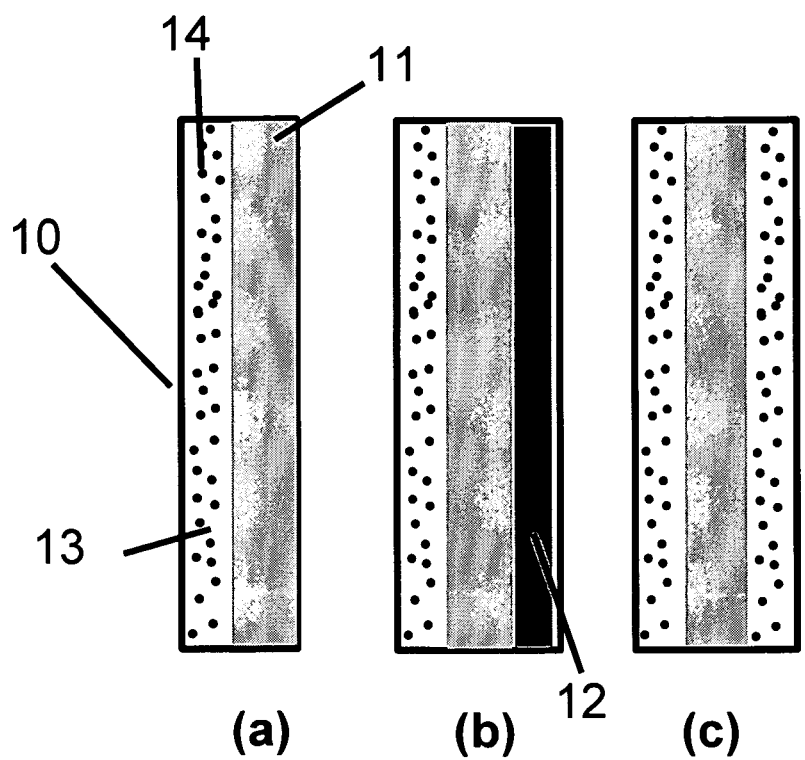
FIG. 1 is a drawing illustrating several embodiment of the inventive solid polymer electrolytes.

FIG. 1 shows a schematic of a three different embodiments of the inventive solid polymer electrolyte 10. SPE 10 typically is thin, less than 100 microns, preferably less than 75 microns, and most preferably less than 40 microns thick. It comprises an ion exchange material 11 that is able to conduct hydrogen ions at a high rate in typical fuel cell conditions. The ion exchange materials may include, but are not limited to compositions comprising phenol sulfonic acid; polystyrene sulfonic acid; fluorinated-styrene sulfonic acid; perfluorinated sulfonic acid; sulfonated Poly(aryl ether ketones); polymers comprising phthalazinone and a phenol group, and at least one sulfonated aromatic compound; aromatic ethers, imides, aromatic imides, hydrocarbon, or perfluorinated polymers in which ionic an acid functional group or groups is attached to the polymer backbone. Such ionic acid functional groups may include, but are not limited to, sulfonic, sulfonimide or phosphonic acid groups. Additionally, the ion exchange material 11 may further optionally comprise a reinforcement to form a composite membrane. Preferably, the reinforcement is a polymeric material. The polymer is preferably a microporous membrane having a porous microstructure of polymeric fibrils, and optionally nodes. Such polymer is preferably expanded polytetrafluoroethylene, but may alternatively comprise a polyolefin, including but not limited to polyethylene and polypropylene. An ion exchange material is impregnated throughout the membrane, wherein the ion exchange material substantially impregnates the microporous membrane to render an interior volume of the membrane substantially occlusive, substantially as described in Bahar et al, RE37,307, thereby forming the composite membrane.

The SPE 10 of FIG. 1 also comprises a plurality of particles 14 supporting a catalyst, where the particles are dispersed in a substantially air occlusive, electronically insulating layer 13 adjacent to the surface. A plurality of the particles 14 supporting a catalyst have a size less than about 75 nm, or preferably less than about 50 nm. Such particles 14 may be agglomerated together in groups of two, three or even in larger groupings of many particles, though it is preferable that they are separated in smaller clusters of a few particles, and most preferably, as individual particles. The insulating layer 13 may be only on one side of the ion exchange material 11 (FIGS. 1a and 1b) or on both sides (FIG. 1c). Optionally, a second ion exchange material 12 may also be present (FIG. 1b) on the side opposite the electronically insulating layer 13. The composition of ion exchange material 12 may be the same as ion exchange material 11, or it may be of a different composition.

Figure 2:
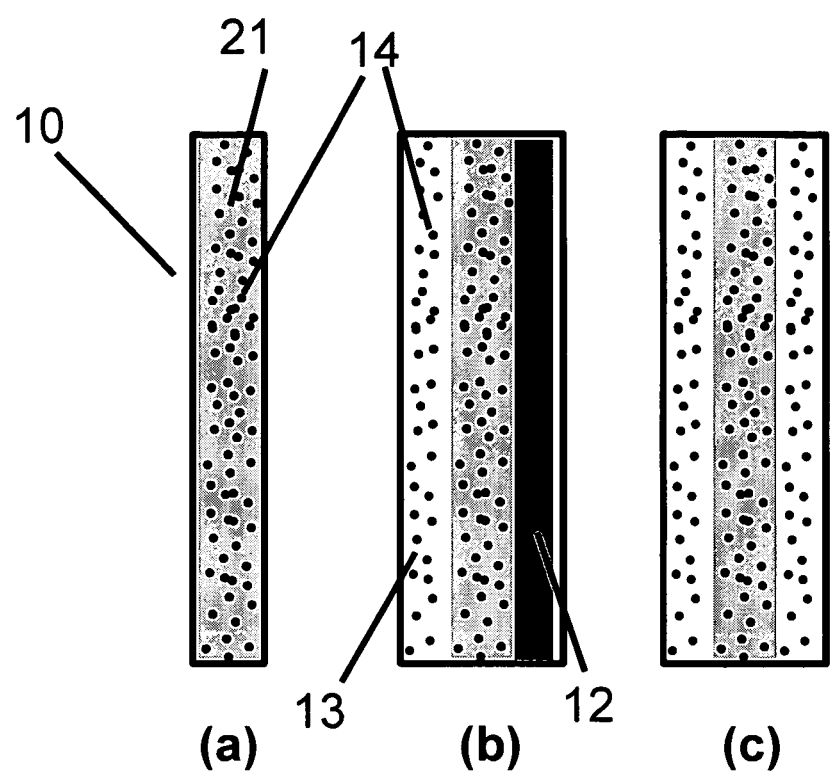
FIG. 2 is a drawing illustrating additional embodiments of the inventive solid polymer electrolytes.
Figure 3:
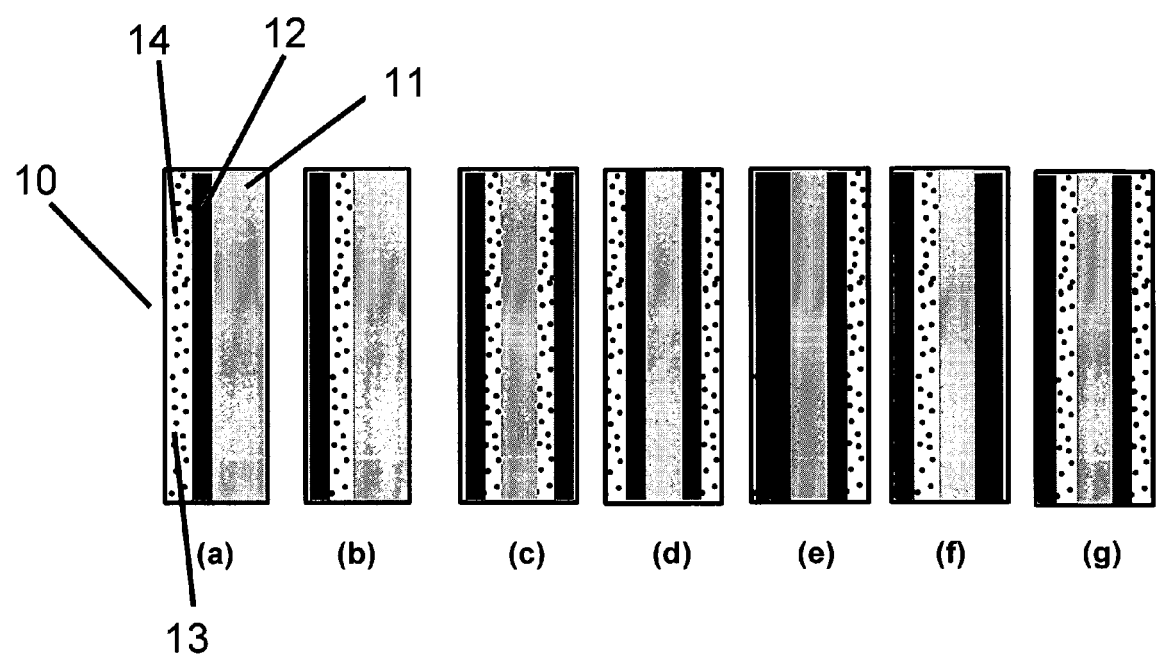
FIG. 3 is a drawing illustrating further embodiments of the inventive solid polymer electrolytes.
Figure 4:
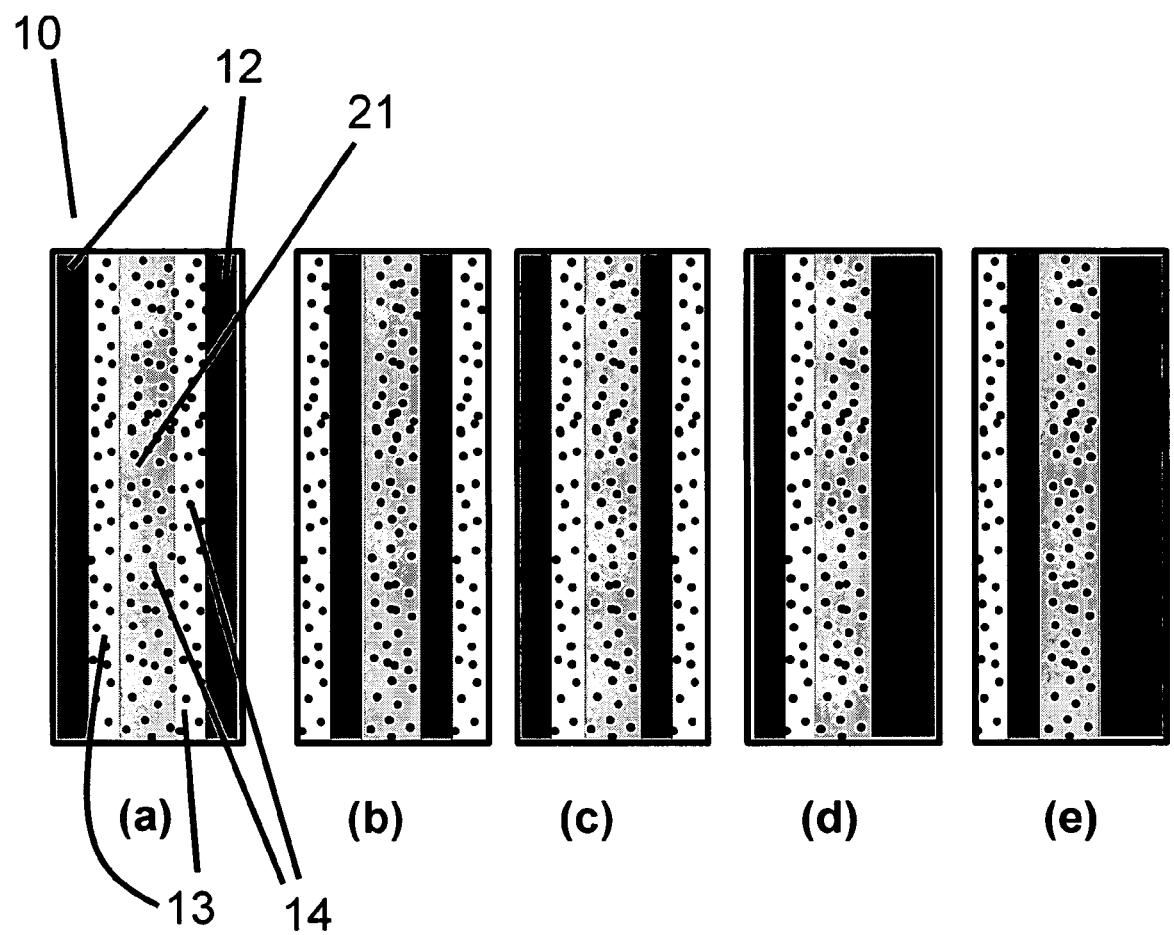
FIG. 4 is a drawing illustrating yet additional embodiments of the inventive solid polymer electrolytes.

FIGS. 2-4 schematically illustrate alternative approaches for the inventive solid polymer electrolyte. In FIG. 2, the solid polymer electrolyte 10 has a plurality of particles 14 supporting a catalyst within a composite membrane 21 consisting essentially of at least one expanded PTFE membrane having a porous microstructure of polymeric fibrils, and (b) a solid dispersion comprising a plurality of first carbon particles supporting a catalyst comprising platinum and at least one ion exchange material, wherein a plurality of the carbon particles has a particle size less than about 75 nm, and the solid dispersion is impregnated throughout the porous microstructure of the expanded PTFE membrane so as to render an interior volume of the expanded PTFE membrane substantially occlusive. Additionally, a substantially air occlusive, electronically insulating layer 13 may be adjacent to one (FIG. 2b) or both (FIG. 2c) surfaces. Optionally, a second ion exchange material 12 of the same, or of a different composition than used in 21 may also be present (FIG. 1b) on the side opposite the electronically insulating layer 13. Alternatively, ion exchange material 11, ion exchange material 12, composite membrane 21, and substantially air occlusive, electronically insulating layer 13 may also be present in various alternating arrangements, some examples of which are schematically in FIG. 3a-FIG. 3g and FIG. 4a-FIG. 4e.

Figure 5:
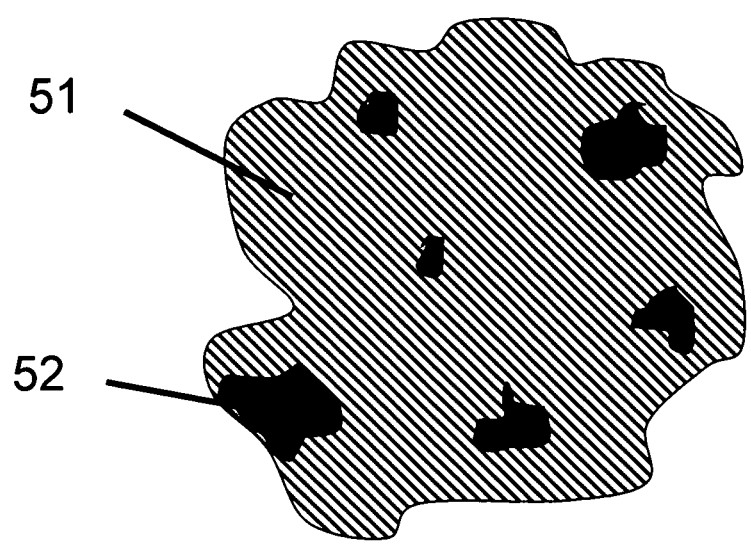
FIG. 5 is a schematic of catalyst particles on a supporting particle.

A schematic of the cross-section of the particles 14 supporting a catalyst used in the inventive materials is shown in FIG. 5. The particles 14 comprise a support material 51 onto which catalyst 52 has been deposited. Support material may comprise silica; zeolites; carbon; and oxides and carbides of the group IVB, VB, VIB VIIB, and VIII transition metals; and combinations thereof. Carbon is a particularly preferable support material. They preferably have high surface area, and so should be small in size, less than 75 nm, or preferably less than 50 nm, or less than 25 nm. They may also optionally be porous. Catalyst 52 comprises metals, oxides or carbides known to be active catalytically for the oxidation of active species. These include, but are not limited to catalysts comprising precious metals, for example platinum, gold, palladium, rhodium, iridium, ruthenium and combinations thereof; and catalytically active oxide and carbides of the group IVB, VB, VIB VIIB, and VIII transition metals; and combinations thereof. Particularly preferable catalysts are platinum metal or platinum metal alloys. The catalyst 52 is small in size to maximize its surface area and increase its effectiveness, preferably between about 1 nm and 10 nm in size.

Use of such catalysts on support particles as described herein in any membrane reduces membrane degradation as observed by very low fluoride release rates during fuel cell operation. In order to achieve very long life in a fuel cell, a combination of a high SPE strength and a layer comprising a plurality of catalyst on a supporting particle should be present in the electrolyte. The strength of the membrane can be quantified using several approaches known in the art, but herein, we choose to quantify strength using a tensile test. The details are described more fully below, but four parameters are extracted from this test, the failure force, the tensile strength, the modulus and the stiffness. At least one of these must be above a critical value to achieve the very long electrolyte life described in this invention. The solid polymer electrolyte can achieve the high strength using any of the approaches known in the art to improve strength in polymer films, including but not limited to, adjusting processing to prepare high strength polymer films, for example by extrusion or stretching to orient the polymer film; reinforcing the film with inorganic or polymer particles; or by reinforcing with fabrics, porous or microporous inorganic or polymer films. Particularly preferably methods for preparing a strong solid polymer electrolyte are those taught by Bahar in '707, or by Hobson in '203, which use microporous ePTFE membranes to form composite electrolytes.

An inventive method for preparing an air occlusive integral composite membrane has also been discovered. The method comprises the steps of (a) preparing an ink solution comprising a precious metal catalyst on a supporting particle and an ion exchange material; (b) providing a polymeric support having a microstructure of micropores; (c) applying either the ink solution or a solution comprising an ion exchange resin to the polymeric support; (d) optionally, repeating step (c); wherein at least one application in step (c) or (d) uses the ink solution. In this application, an ink is considered to be a solution containing a catalyst on a supporting particle that is dispersed in a solvent. The ink solution preferably also contains an ion exchange polymer. Solvents used in the ink are those generally known in the art, including but not limited to alcohols, such as ethanol and propanol, or other organic solvents. The preparation of the ink solution preferably uses a high shear mixer, where the high shear mixer may include, but is not limited to, microfluidizers, and rotor-stator mixers comprising at least one stage. Particularly preferable high shear mixers are microfluidizers capable of operating at pressures between 5.000 psi and 25,000 psi. The ink is preferably very well mixed, which may be accomplished by one, two, three or more passes through the high shear mixer. The concentration of the precious metal catalyst in the ink is between about 0.1% and about 20% by dry weight of the ion exchange material, and preferably between about 0.5% and about 3%. This ink may be prepared in one, two or more separate steps if desired. If it is prepared in two or more steps, a more concentrated solution is made in the first step, and subsequent steps are dilutions with ion exchange material to arrive at the final desired concentration. When more than one step of preparing the ink is used, the high shear mixing step described above may be used in one or more of the ink preparation steps. If desired, the first step in a multi-step ink preparation process may be accomplished in advance of the succeeding steps, in which case the ink may be stored for a period of time. If such a concentrated ink is stored for longer than about 30-60 minutes, then the high shear mixing step is preferably repeated at least once, and more preferably two or three times before any subsequent dilution steps needed to arrive at the final ink used for subsequent processing.

Additional steps to remove large agglomerates in the ink solution may also be performed, if desired, at any stage during the ink preparation. Such steps may include, but are not limited to, filtering and using a centrifuge. In either case, the number of large particles removed can be controlled. In the former, by the particular filter chosen; in the latter, by the length of time the sample is centrifuged, and/or the speed of the centrifuge. The centrifuge speed may be varied from between a few hundred rpm, to many thousand rpm, with the higher speeds being preferable. The time to centrifuge may vary from a few minutes to an hour or longer. Shorter times at higher speeds, for example less than 30 minutes at 3000-5000 rpm, are preferable to reduce processing times.

The ion exchange material in the ink may be any known in the art, for example those described above for ion exchange material 11. The precious metal catalyst on a supporting particle may be any of those described above for FIG. 5, 52 and 51, respectively.

The polymeric support having a microstructure of micropores, may be any such material known in the art, including but not limited to microporous polyethylene, polypropylene or polytetrafluoroethylene. A particularly preferable polymeric support is expanded PTFE, such as those described in U.S. Pat. No. 3,953,566 to Gore, in U.S. Pat. No. 6,613,203 Hobson et. al., or in U.S. Pat. No. 5,814,405 to Branca, et. al. Preferably, the polymeric support should be sufficiently strong and/or heavy so that the final solid polymer electrolyte has a failure force (defined more fully below) of greater than 115 g.

Figure 6:
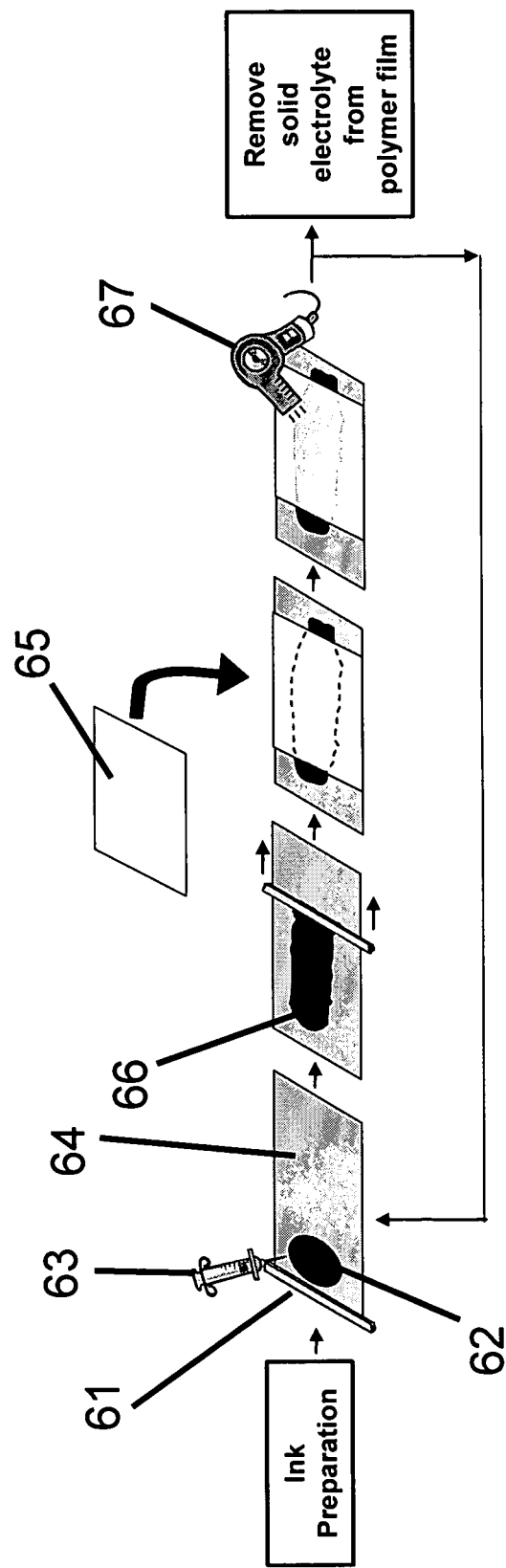
FIG. 6 schematically illustrates an embodiment of the inventive method for preparing the inventive solid polymer electrolytes.

The ink solution or a solution comprising an ion exchange resin may be applied to the polymeric support using any process known in the art, including but not limited to the process described in U.S. Pat. No. RE37,707 to Bahar et. al. Another embodiment of the method of the invention for applying the ink to the polymeric support is shown in FIG. 6. In this embodiment, an ink is applied to a thin polymer film 64 using any means known to one of ordinary skill in the art, for example using a pump, syringe 63 or such. The ink is prepared as described above, so may be prepared in a multistep process starting with a concentrated ink that is subsequently diluted, or directly in one step to obtain the desired catalyst concentration in the ink. The applied ink 62 is then spread into a thin layer 66 using any means known in the art for making a thin liquid layer, including but not limited to a draw bar or meyer bar, shown schematically in FIG. 6 as 61. Subsequently, the polymeric support 65 having a microstructure of micropores is placed on the liquid layer 66 and allowed to imbibe. The thin polymer film 64 comprises polyethylene, polyethylene terephthalate polypropylene, poly vinylidene chloride, polytetrafluoroethylene, polyesters, or combinations thereof, and may further comprise a coating of a release material, for example a fluoropolymer compound, to enhance the release of the final product from the polymer film. After the film is completely imbibed, it is allowed to dry, and may optionally be heated to decrease the drying time. Such heating, shown schematically in FIG. 6 as 67, may be accomplished with any means known in the art, including but not limited to forced air heaters, ovens, infrared driers and the like. The process may be repeated if desired, using the same or a different ink, or the same or a different ion exchange resin.

When the imbibing steps are completed, an additional heating step at an elevated temperature may optionally be applied using an oven, infrared heater, forced air heater or the like. The temperature of this heating step is between about 100° C. and about 175° C. and preferably between about 120 degrees C. and about 160° C. The solid polymer electrolyte is held at the elevated temperature for between about 1 minute and about 10 minutes, and preferably for between about 1 minutes and about 3 minutes. Finally, the completed solid polymer electrolyte membrane is cooled, and removed from the thin polymer film before use. The removal may be accomplished by simply pulling the SPE off the thin polymer film, either in air or in water.

As is well understood by one of ordinary skill in the art, the process described above and in FIG. 6 can by automated using roll goods, and automated pay-off and collection systems so that each step is accomplished in a continuous fashion, and the final product is a roll of solid polymer electrolyte supported on a thin polymer film.

Figure 7:
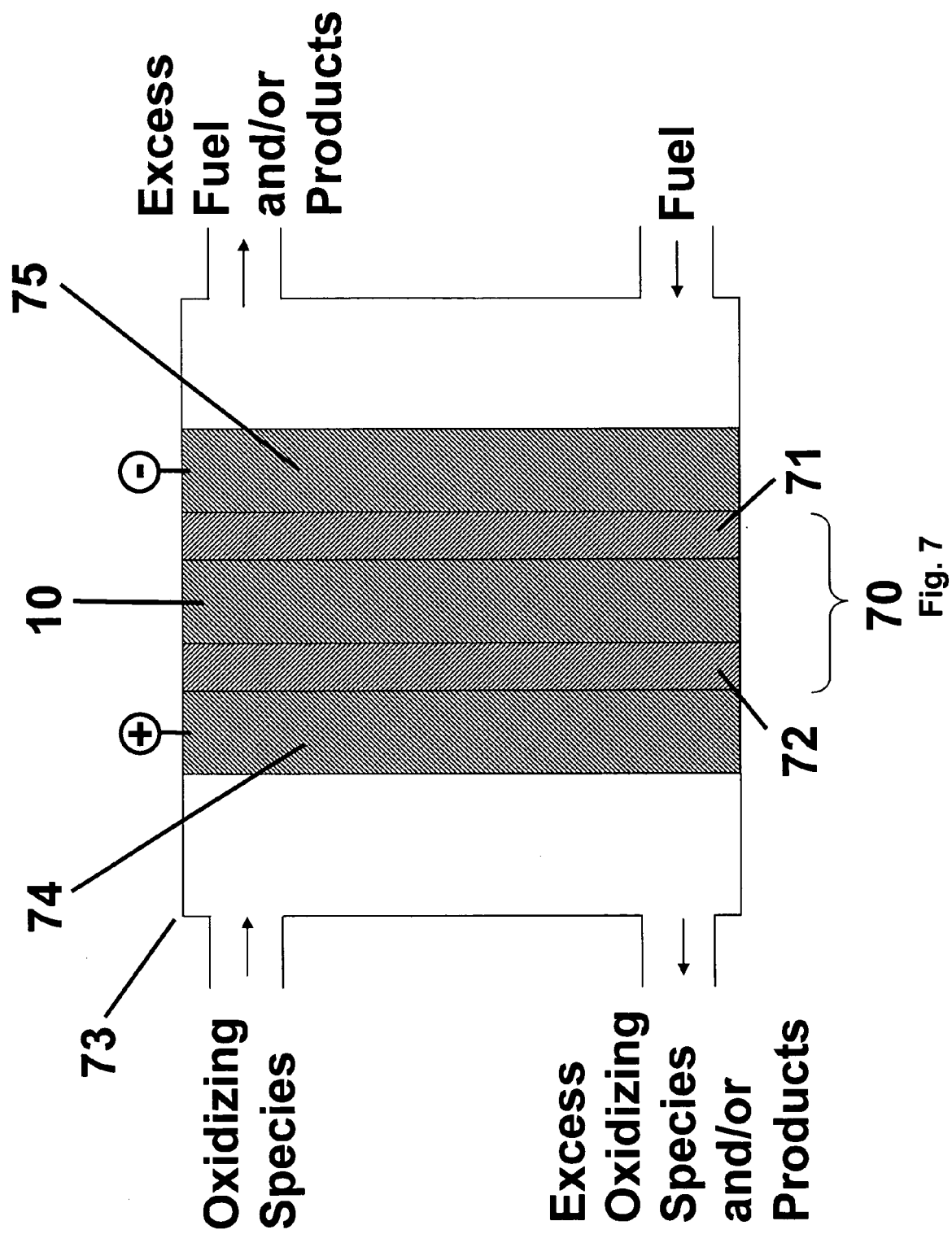
FIG. 7 is a drawing of a fuel cell that uses the inventive solid polymer electrolyte.

The solid polymer electrolyte of the instant invention may also be used to form a catalyst coated membrane (CCM) using any methods known in the art. In FIG. 7, the CCM 70 comprises an anode 71 of a catalyst for oxidizing fuel, a cathode 72 for reducing an oxidant, and the solid polymer electrolyte 10 described above interposed between the anode and cathode. The anode and cathode may be prepared using any of the procedures known in the art including but not limited to physical or chemical deposition, either on a supporting particle, or directly on the SPE, or from a catalyst-containing ink solution containing the catalysts that is deposited either directly on the SPE, or on a film that is subsequently used in a lamination step to transfer the electrode to the SPE.

The anode and cathode electrodes comprise appropriate catalysts that promote the oxidation of fuel (e.g., hydrogen) and the reduction of the oxidant (e.g., oxygen or air), respectively. For example, for PEM fuel cells, anode and cathode catalysts may include, but are not limited to, pure noble metals, for example Pt, Pd or Au; as well as binary, ternary or more complex alloys comprising the noble metals and one or more transition metals selected from the group Ti, V, Cr, Mn, Fe, Co, Ni, Cu, Zn, Y, Zr, Nb, Mo, Ru, Rh, Ag, Cd, In, Sn, Sb, La, Hf, Ta, W, Re, Os, Ir, Tl, Pb and Bi. Pure Pt is particularly preferred for the anode when using pure hydrogen as the fuel. Pt—Ru alloys are preferred catalysts when using reformed gases as the fuel. Pure Pt is a preferred catalyst for the cathode in PEMFCs. The anode and cathode may also, optionally, include additional components that enhance the fuel cell operation. These include, but are not limited to, an electronic conductor, for example carbon, and an ionic conductor, for example a perfluorosulfonic acid based polymer or other appropriate ion exchange resin. Additionally, the electrodes are typically porous as well, to allow gas access to the catalyst present in the structure.

A fuel cell 73 can also be formed from the instant invention. As shown in FIG. 7, such PEM fuel cells 73 comprise the CCM 70 and may optionally also include gas diffusion layers 74 and 75 on the cathode 72 and anode 71 sides, respectively. These GDM function to more efficiently disperse the fuel and oxidant. The fuel cell may optionally comprise plates (not shown in FIG. 7) containing grooves or other means to more efficiently distribute the gases to the gas diffusion layers. As is known in the art, the gas diffusion layers 74 and 75 may optionally comprise a macroporous diffusion layer as well as a microporous diffusion layer. Microporous diffusion layers known in the art include coatings comprising carbon and optionally PTFE, as well as free standing microporous layers comprising carbon and ePTFE, for example CARBEL® MP gas diffusion media available from W. L. Gore & Associates. The fluids used as fuel and oxidant may comprise either a gas or liquid. Gaseous fuel and oxidant are preferable, and a particularly preferable fuel comprises hydrogen. A particularly preferable oxidant comprises oxygen.

The following test procedures were employed on samples which were prepared in accordance with the teachings of the present invention.

TEST PROCEDURES

Cell Hardware and Assembly

For all examples, standard hardware with a 23.04 $cm^2$ active area was used for membrane electrode assembly (MEA) performance evaluation. This hardware is henceforth referred to as "standard hardware" in the rest of this application. The standard hardware consisted of graphite blocks with triple channel serpentine flow fields on both the anode and cathode sides. The path length is 5 cm and the groove dimensions are 0.70 mm wide by 0.84 mm deep.

Two different cell assembly procedures were used. In the first procedure, designated as procedure No. 1, the gas diffusion media (GDM) used was a microporous layer of Carbel® MP 30Z placed on top of a Carbel® CL gas diffusion layer (GDM), both available from W. L. Gore & Associates, Elkton, Md. Cells were assembled with two 10 mil UNIVERSAL® ePTFE gaskets from W. L. Gore & Associates, having a square window of 5.0 cm×5.0 cm, two 2.0 mil polyethylene naphthalate (PEN) films (available from Tekra Corp., Charlotte, N.C.) gaskets hereafter referred to as the spacer, and two 1.0 mil polyethylene naphthalate (PEN) films hereafter referred to as the sub-gasket. The sub-gasket had an open window of 4.8×4.8 cm on both the anode and cathode sides, resulting in a MEA active area of 23.04 cm.

In the second procedure, designated as procedure No. 2, assembly materials were the same as procedure No. 1, with the exceptions that the GDM used was Carbel® CL GDM alone, and no spacers were incorporated.

All the cells were built using spring-washers on the tightened bolts to maintain a fixed load on the cell during operation. They are referred to as spring-loaded cells. The assembly procedure for the cells was as follows:

1. The 25 cm$^2$ triple serpentine channel design flow field (provided by Fuel Cell Technologies, Inc, Albuquerque, N. Mex.) was placed on a workbench;
2. One piece of 10 mil ePTFE gasket with a 2.0 mil PEN spacer was placed on anode side of the flow field;
3. One set of the GDM was placed inside the gasket so that the MP-30Z layer was facing up;
4. The window-shaped sub-gasket of PEN sub-gasket sized so it slightly overlapped the GDM on all sides was placed on top of the GDM;
5. The anode/membrane/cathode system was placed on top of the sub-gasket with anode-side down;
6. Steps (2) through (4) were repeated in reverse order to form the cathode compartment. The gasket used on the cathode side was the same as that used on the anode side.
7. There are total of eight bolts used in each cell, all bolts had spring washers, Belleville disc springs, purchased from MSC Industrial Supply Co. (Cat# 8777849). The bolts were then tightened to a fixed distance that previously had been established to provide a compressive pressure of 100-120 psi in the active area. Compression pressure was measured by using Pressurex® Super Low Film pressure paper from Sensor Products, Inc., East Hanover, N.J.

Fuel Cell Life Testing

Because the inventive membranes typically last a very long time (thousands of hours) under normal fuel cell operating conditions, two different types of accelerated test protocols were developed to establish membrane lifetimes. These protocols, identified as Test Protocol 1 and Test Protocol 2, are described more fully below.

Test Protocol 1

Materials to be tested were prepared as outlined below in the examples, and then assembled into a cell using the procedure outlined above. The cell was connected to a test station, conditioned, and then the test was started under test temperature and pressure as outlined below. The assembled cells were tested in fuel cell test stations with GlobeTech gas units 3-1-5-INJ-PT-EWM (GlobeTech, Inc., Albuquerque, N. Mex.), and Scribner load units 890B (Scribner Associates, Southern Pines, N.C.). The humidification bottles in these stations were replaced by bottles purchased from Electrochem Corporation (Woburn, Mass.). The humidity during testing was carefully controlled by maintaining the bottle temperatures, and by heating all inlet lines between the station and the cell to four degrees higher than the bottle temperatures to prevent any condensation in the lines. In all cases the inlet and/or outlet relative humidity of the anode and/or cathode was measured independently using dew point probes from Vaisala (Vantaa, Finland) to ensure the input hydrogen and air were humidified to desired relative humidity (RH) at the testing temperatures.

The cells were first conditioned at a cell temperature 80° C. with 100% relative humidity inlet gases on both the anode and cathode. The outlet gas pressure of both sides was controlled to be 15 psig. The gas applied to the anode was laboratory grade hydrogen supplied at a flow rate of 1.3 times greater than what is needed to maintain the rate of hydrogen conversion in the cell as determined by the current in the cell (i.e., 1.3 times stoichiometry). Filtered, compressed and dried air was supplied to the cathode humidification bottle at a flow rate of 2.0 times stoichiometry.

The cells were conditioned for 4 hours. The conditioning process involved cycling the cell at 80° C. between a set potential of 600 mV for 30 seconds, 300 mV for 30 seconds and 950 mV for 5 seconds for 4 hours. Then a polarization curve was taken by controlling the applied potential beginning at 600 mV and then stepping the potential in 50 mV increments downwards to 400 mV, then back upward to 900 mV in 50 mV increments, recording the steady state current at every step. The open circuit voltage was recorded between the potential steps of 600 mV and 650 mV.

After the above procedure, the cells were set to the life-test conditions. This time was considered to be the start of the life test, i.e., time equal to zero for all life determinations. Specific test conditions in this protocol were (Table 2): cell temperature of 95° C., 50% RH for both hydrogen and air, with a stoichiometry of 1.3 and 2.0, respectively. Outlet pressure was 25 psig in all cases. The current density of the cells in Protocol No. 1A and Protocol No. 1B was controlled to be 100, and 800 mA/cm$^2$, respectively.

TABLE 2

| | | | Operation Conditions for Accelerated Chemical Degradation Tests | | | |
|---|---|---|---|---|---|---|
| Protocol No. | Cell Temp. (° C.) | Gas Type (anode/cathode) | Inlet RH (%) (anode/cathode) | Gas Stoichiometry (anode/cathode) | Current Density (mA/cm$^2$) | Outlet Pressure (anode/cathode) (psig) |
| 1A | 95 | H$_2$/Air | 50/50 | 1.3/2.0 | 100 | 25/25 |
| 1B | 95 | H$_2$/Air | 50/50 | 1.3/2.0 | 800 | 25/25 |

Test Protocol 2

In test Protocol 2, the materials were prepared as described below in the examples, and assembled into cells as described above. The cells were then conditioned, and subsequently tested using the procedure outlined more fully below. Life of the membrane was determined using the physical pin-hole test described below.

The test stations used for this protocol were fuel cell test stations with Teledyne Medusa gas units Medusa RD-890B-1050/500125 (Teledyne Energy Systems, Hunt Valley, Md.), and Scribner load units 890B. The gas units were modified with additions of solenoid valves from Parker outside of the humidification bottles. These valves control directions of gas flow so that the cells can be tested in wet and dry cycles.

The conditioning procedure used in this protocol was as follows: the cells were first conditioned at a cell temperature 70° C. with fully humidified (100% RH) inlet gases. The gas applied to the anode was laboratory grade hydrogen supplied at a flow rate of the greater of 150 cc/min or 1.2 times greater than what is needed to maintain the rate of hydrogen conversion in the cell as determined by the current in the cell (i.e., 1.2 times stoichiometry). Filtered, compressed and dried air was supplied to the cathode at a flow rate of the greater of 650 cc/min or two times stoichiometry. Then, the cells were continuously cycled at 70° C. by fixing a set potential of 600 mV for 45 seconds, followed by open circuit voltage (OCV) for 30 seconds, 300 mV for 60 seconds, and finally OCV for 30 seconds. This cycling was repeated continuously for 10 hours. Then a polarization curve was taken by controlling the applied potential beginning at 600 mV for 8 minutes and then stepping through the following potentials and times intervals: 500 mV for 8 minutes, 400 mV for 8 minutes, 450 mV for 8 minutes, 550 mV for 8 minutes, 650 mV for 8 minutes, 750 mV for 8 minutes, 850 mV for 6 minutes, 900 mV for 4 minutes, 800 mV for 6 minutes, 700 mV for 8 minutes, 600 mV for 8 minutes, recording the steady state current at every step. Then the following current densities were applied in steps: 100 mA/cm$^2$ for 3 minutes, 500 mA/cm$^2$ for 3 minutes, 800 mA/cm$^2$ for 3 minutes, and finally the cell was left at open circuit potential for 2 minutes, recording the steady state potential at every step.

After the above procedure, the cells remain at 700 mV for between 0 and 24 hours. Then the cell was pressured to 25 psig. The cells were further conditioned at a cell temperature of 80° C. with dry relative humidity inlet gases on both the anode and cathode. The hydrogen gas applied to the anode was at a utilization of 0.83 with a minimum flow rate of 50 cm$^3$/min. Filtered, compressed and dried air was supplied to the cathode at a flow rate of the greater of 100 cm$^3$/min or 4.0 times stoichiometry. The current was set to 200 mA/cm$^2$ for 30 minutes and the potential was recorded. Then the cell was changed to 100% RH inlet gases for 90 seconds. An open circuit voltage decay measurement was then initiated by stopping the gas flow on the cathode and removing the load. The resulting voltage was measured every 3 seconds for 1 minute as the oxygen on the cathode is consumed by hydrogen crossing over from the anode to cathode. This is a measure of membrane health at beginning of life, under pressure. The flow on the anode was then set to 150 cc/min and 650 cc/min on the cathode for 10 seconds under no load. Then the load is applied at 800 mV for 20 seconds. Finally the anode flow was set to the greater of 50 cc/min or 1.2 times stoichiometry and cathode flow is set to the greater of 100 cc/min or four times stoichiometry. The current was set to 200 mA/cm$^2$ for 30 seconds and the potential is recorded. This ends the initial conditioning.

After initial conditioning and diagnostics, the MEA was tested under the following test conditions. The cell temperature remained at 80° C. The cell was pressurized on the anode with hydrogen and on the cathode with air to 25 psig. The hydrogen flow rate on the anode was at 1.2 times stoichiometry with a minimum flow rate of 50 cm$^3$/min. Air was supplied to the cathode at a flow rate of the greater of 100 cm$^3$/min or 4.0 times stoichiometry. The current was set to 200 mA/cm$^2$ and potential was recorded. The inlet gas was cycled from by pass of the humidification bottles to flow through the humidification bottles. This cycling is controlled by the solenoid valves that switch every 45 seconds. The result was an inlet humidification that rises and falls every 45 seconds. The inlet gases reach the following maximum and minimum humidification:

Anode wet condition 61° C. dew point=44% RH
Anode dry condition 31° C. dew point=10% RH
Cathode wet condition 75° C. dew point=80% RH
Cathode dry condition 14-20° C. dew point=3-5% RH During the test, the open circuit voltage (OCV) decay was measured two times every hour. The first measurement was done after a 45 second wet cycle, and the second 30 minutes later after a 45 second dry cycle. These measurements were made under pressure and automatically by the test station, as described above except that the air flow to the cathode was shut off for 3 minutes, instead of 1 minute.

Chemical Degradation Rate:

For all the tests the amount of fluoride ions released into the product water was monitored as a means to evaluate chemical degradation rate. This is a well-known technique to establish degradation of fuel cell materials that contain perfluorosulfonic acid ionomers. Product water of fuel cell reactions was collected at the exhaust ports throughout the tests using PTFE coated stainless steel containers. The collected water was then concentrated about 20 fold (for example, 2000 ml to 100 ml) in PTFE beakers heated on hot plates. Before concentration, 1 ml of 1M KOH was added into the beaker to prevent evaporation of HF. Fluoride concentration in the concentrated water was determined using an $F^-$-specific electrode (ORION® 960900 by Orion Research, Inc.). Fluoride release rate in terms grams $F^-/cm^2$-hr) was then calculated.

Membrane Life Measurement

The life of the membrane was established by determining the presence of flaws in the membrane that allow hydrogen to cross through it. In this application, this so-called hydrogen cross-over measurement was made using a flow test that measures hydrogen flow across the membrane. Because this test is somewhat tedious, and may itself weaken the membrane, it was only performed when there was an indication that the integrity of the membrane was questionable. The membrane integrity was thus first evaluated during testing using an OCV decay measurement performed at ambient pressures. In Test Protocol 1, this measurement was carried out while the cell remained as close as possible to the actual life test condition. In Test Protocol 2 this measurement was performed under 100% RH conditions. This ambient OCV decay test was performed periodically as indicated by the performance of the cell. Typically, it was performed less frequently near the beginning of cell life (e.g., once a week), and more frequently the longer the cell operated (e.g., as often as once per day toward the end of life). Details of the measurement were as follows:

1. The cell was set at 0.6V, anode and cathode minimum flow rate to be 800 cc/min. and 0 cc/min, respectively;
2. The outlet pressure of anode and cathode side was reduced to 2.0 and 0 psig, respectively;

3. The cell was then taken off load while remaining at the test temperature; meanwhile, outlet flow of the cathode side was shut off by a valve;
4. The OCV value was recorded every second for 180 seconds;
5. The decay in the OCV during this measurement was examined. If this decay was significantly higher than previously observed, e.g., when the open circuit voltage value decayed to less than 250 mV in less than 30 seconds, a physical flow check was initiated to determine if the membrane had failed;
6. If the decay was close to that of the previous measurement, the life testing was resumed. When a physical flow check was indicated, it was performed as follows:
7. The cell was taken off load, and set at open circuit condition while maintaining the cell temperature and RH conditions at the inlets. The gas pressure of the cell was then reduced to ambient pressure on both anode and cathode sides.
8. The gas inlet on the cathode was disconnected from its gas supply and capped tightly. The cathode outlet was then connected to a flow meter (Agilent® Optiflow 420 by Shimadzu Scientific Instruments, Inc., Columbia, Md.). The anode inlet remained connected to the $H_2$ supply and anode outlet remained connected to the vent.
9. The anode gas flow was increased to 800 cc/min, and the anode outlet pressure was increased to 2 psi above ambient pressure.
10. In Test Protocol 2, the $H_2$ gas is supplied at 0% RH for 30 minutes.
11. The amount of gas flow through the cathode outlet was measured using the flow meter.
12. A failure criterion of 2.5 cc/min was established, so that when the measured gas flow of $H_2$ was greater than this value, the membrane was identified as having failed.
13. If the criterion for failure was met the test was stopped, and the membrane life was recorded as the number of hours the cell had been under actual test conditions when it failed the physical flow check (>2.5 cc/min). If the criterion for failure was not met, the cell was returned to testing.

Mechanical Property Measurement

Certain membranes were subjected to mechanical testing at room conditions of 21° C. and 60% RH. A dynamic mechanical analyzer (DMA) (TA Instruments, Wilmington, Del.) mode RSA3 was used. Each membrane type tested in machine as well as transverse directions. The membrane was die cut to a rectangular shape with a width of 4.8 mm, and a length of 50 mm. The grip gap was set to be 15 mm, and the membrane sample was pulled at the rate of 0.5 mm/s until failure. Tension force during the sample elongation was recorded, and the maximum value before sample failure was regarded as the failure force. 10 During data analysis, values of force were plotted against elongation. The slope of the linear portion of the curve, specifically, from 0 to 0.04 elongation portion of the curve was calculated as the stiffness. Cross sectional area for each sample was calculated using sample width, i.e. 4.8 mm, times sample thickness. Values of failure force and stiffness were divided by sample's cross section area to obtain strength and modulus values, respectively. The lesser values of the mechanical properties from the transverse and machine direction are those reported here as Failure Force, Stiffness, Strength and Modulus.

Platinum Loading Measurement

To confirm that the platinum used to prepare the inventive solid polymer electrolytes had not been lost in processing, the amount of platinum in the membranes was measured using a bench-top x-ray fluorescence unit (XRF from SPECTRO TITAN, Kleve, Germany) pre-calibrated to display Pt content in units of mg Pt per $cm^2$ surface area. Three separate measurements of the concentration of sections of the as-prepared solid polymer electrolytes were taken by placing the as-prepared inventive solid polymer electrolyte in the unit and recording the displayed values. The values reported in the examples below are the average values of the three measurements taken for each material. In all cases, the measured amounts were equal to the expected amounts within experimental error of the measurement.

Transmission Electron Microscopy and Interparticle Spacing Measurement

In order to observe distribution of supported catalysts inside the membrane, transmission electron microscopy (TEM) was performed on cross sections of selected inventive solid polymer electrolytes. A section of the solid polymer electrolyte was embedded in Spurr® epoxy resin and cured at 60° C. for eight hours. The embedded sample was first trimmed with a razor blade and then thin sectioned at room temperature using a Diatome diamond knife on a Leica Ultracut UCT ultramicrotome. The microtome was set to cut 75 nm thick sections which were collected on 300 mesh copper grids. TEM was performed using a JEM 2010 Field Emission TEM, at 200 KV at various magnifications. The interparticle spacing between support particles was determined as follows: a micrograph representative of the observed microstructure was obtained at a magnification where a large number of the plurality of support particles could be seen, at least 20, and preferably at least 50. The distance between 15 different pairs of surrounding neighbors of the plurality of support particles chosen at random was measured. The interparticle spacing was calculated as the average of the 15 measurements. To determine the interparticle spacing between catalyst particles, the following procedure was used: a micrograph representative of the catalyst particles on the support particle was obtained at a magnification where at least one support particle could be observed, and a plurality of catalyst particles on the support could be seen, at least 4, and preferably 6 or more. The distance between 6 to 10 different pairs of the plurality of support particles chosen at random was measured, and the interparticle spacing was calculated as the average of the measurements.

Without intending to limit the scope of the present invention, the solid polymer electrolytes and method of production of the present invention may be better understood by referring to the following examples

EXAMPLES

In the examples below, three different ion exchange materials were used to prepare solid polymer electrolytes. The first material, identified herein as Type 1, was prepared according to the teachings of Wu, et. al in U.S. Patent Application 20030146148, Example 5 except the reactants were adjusted to produce a product with equivalent weight of about 920.

This polymer had a melt flow index (MFI) that was typically 6±2 g/10 min with a range between 2 and 12. The MFI was measured by placing a 2160 gram weight onto a piston on a 0.8 cm long die with a 0.20955 cm orifice, into which 3-5 grams of as-produced polymer had been placed. Three separate measurements of the weight of polymer that flowed through the orifice in 10 minutes at 150° C. was recorded. The MFI in g/10 min was calculated as the average weight from the three measurements times 3.333. To make the ion exchange material more stable, this product was treated with 500 kPa fluorine gas at 60° C. in one five-hour cycle and three four-hour cycles, each one separated by an evacuation step, essentially according to the teachings in GB 1,210,794. The polymer was subsequently extruded, pelletized and acidified using procedures standard in the art. Then it was made into a dispersion by forming a solution of 20%-30% of the acid form of the Type 1 polymer, 10-20% deionized water, and balance alcohol in a glass-lined pressure vessel. The vessel was sealed, and the temperature was raised to 140° C. at a rate slow enough to maintain the pressure at less than 125 psi. It was held at 140° C. and about 125 psi for 2.5 hours. Then, a final solution was obtained by adding sufficient water to produce a solution consisting of approximately 20% solids, 20% water and 60% alcohol.

A second ion exchange material, Type 2, was prepared in the same way as Type 1, but the fluorine gas treatment of the ion exchange polymer was effected at 135° C. in 500 kPa of 20% fluorine/80% nitrogen for two 4 hour periods and two 6 hour periods. The acid form of this polymer was formed into a dispersion as described above for the Type 1 polymer except the temperature and pressure during the solution preparation process was 160° C. and 210 psi. The MFI of this polymer was typically 4.4 g/10 min with a range between 2 and 12.

The final polymer, Type 3, was prepared as described for Type 1 but it had an MFI of about 0.9 g/10 min. It was treated with fluorine gas in the same fashion as Type 2. The polymer was then made into a dispersion by forming a solution of 10% of the acid form of the polymer, and the balance ethanol in a glass-lined pressure vessel. The vessel was sealed, and the temperature was raised to 140° C. at a rate slow enough to maintain the pressure at less than 125 psi, and held at 140° C./125 psi for 2.5 hours. Then, a final solution was obtained by adding a weight of water approximately equal to the polymer weight and then concentrating the solution by evaporating the solvent at room temperature. The final solution then consisted of approximately 20% solids, 20% water and 60% alcohol.

Example 1

In Example 1, a solid polymer electrolyte membrane was prepared as follows:

A concentrated catalyst ink consisting of platinum on a carbon support (type V11-D50 catalyst, Englehard Corporation, Iselin, N.J.) at a 1:1 weight ratio (35% water by weight), Type 1 ion exchange material, and normal propanol in the following approximate ratios, respectively, 8.54%, 4.27%, and 87.19% was prepared. This was accomplished as follows. A slurry was prepared by mixing a portion of the n-propanol with the catalyst powder in an 30 liter glass reactor (H. S. Martin, Inc., Vineland, N.J.) after evacuating it, and refilling with nitrogen. Subsequently, the slurry was pumped into a 50 liter vessel where agitation was supplied for 20 minutes by a rotor/stator agitator (Model AX200 by Silverson Machines Inc., Longmeadow, Mass.) while the solution was recirculated through a ISG motionless static mixer (Charles Ross & Sons, Hauppauge, N.Y.). To this slurry, the ionomer was added continuously over about 45 minutes. The solution of ionomer, solvent and catalyst was further mixed in the same container for an additional 30 minutes. Then, the solution was recirculated through a Model M-700 Microfluidizer (Microfluidics, Newton, Mass.) at 10,000 psig for 45 minutes. Finally, the solution was further mixed using the Silverson mixer with recirculation for an additional 20 minutes. The final concentrated ink solution was pumped into a holding tank, the system flushed with rinse solvent that was subsequently also pumped into the holding tank. The solution was stirred continuously for a five day period with a low shear propeller agitation system and stored in a plastic container for a period of time ranging from a few days to a few weeks. Immediately before use, this ink was passed through a Microfluidizer at 19,000 psig three times. It was then stirred with a magnetic stir bar until use, generally within about 30 minutes.

An inventive solid polymer electrolyte membrane was prepared as follows. First, an expanded polytetrafluoroethylene (ePTFE) membrane was prepared with mass per area of 7.0 g/m$^2$, thickness of 20 microns, and porosity of at least 85%, and a longitudinal matrix tensile strength of about 67 MPa, and a transverse matrix tensile strength of about 76 MPa using the teachings of U.S. Pat. No. 3,953,566 to Gore. The ink prepared above was then diluted with Type 1 ion exchange material to give a concentration of 0.8% platinum based on weight percent of dry ionomer solids. This ion exchange material solution was coated on a polyethylene naphthalate (PEN) film stretched onto a glass plate using a drawdown blade on which the coating gap can be adjusted between 1 and 10 mil. For this first coating, the gap was adjusted to 0.0038 inches (0.00965 cm). The ePTFE membrane was then stretched over the wet coating and allowed to infiltrate. After infiltration, it was dried for 20-60 s with a hair drier. Then, a second coating of the same ion exchange material solution was applied with a 0.0019 inch (0.00483 cm) gap set on the draw bar. The second coating was then also dried with a hair drier for 20-60 s. This membrane was placed in a 160° C. air furnace for three minutes and then removed to cool. The membrane was then removed from the PEN backer being careful not to stretch it severely. The measured platinum loading of this membrane was 0.015 mg/cm$^2$, and the final thickness of the solid polymer electrolyte was 18 microns.

The mechanical properties of a section of this solid polymer electrolyte were tested using the procedures described above. The results for the Failure Force, Stiffness, Strength and Modulus are shown in Table 6.

Another section of the completed solid polymer electrolyte was placed between two PRIMEA® 5510 electrodes (available from Japan Gore-Tex, Inc., Tokyo, Japan) with 0.4 mg Pt/cm$^2$ loading in the each electrode. This sandwich was placed between platens of a hydraulic press (PHI Inc, Model B-257H-3-MI-X20) with heated platens. The top platen was heated to 180 degrees C. A piece of 0.25" thick GR® sheet (available from W. L. Gore & Associates, Elkton, Md.) was placed between each platen and the electrode. 15 tons of pressure was applied for 3 minutes to the system to bond the electrodes to the membrane. This MEA was assembled into a fuel cell as described above, and tested under Test Condition 1A. The Lifetime and Fluoride Release Rate were measured, and results are shown in Table 2.

Example 2

To illustrate the importance of the mechanical properties of the solid polymer electrolytes to the inventive materials herein, a material was made that is otherwise identical to an embodiment of the inventive materials, but has weaker mechanical properties. It thus has low fluoride release rates indicative of a chemically stable membrane, but its life is not as long as Example 1 because the polymer electrolyte membrane is not as strong as that formed in Example 1. The solid polymer electrolyte of this example was prepared as follows. First, an ePTFE membrane was prepared according to the teachings of Gore in '566 with an average mass per area of about 3.3 g/m$^2$, a thickness of about 7.8 microns, an average ball burst strength of about 1.18 lbs, and an average Frazier number of about 42 ft3/min/ft2 at 0.5 inches of water. The ball burst is a standard test (see for example, U.S. Pat. No. 5,814, 405 to Branca, et. al.) performed on porous membranes that measures the relative strength of a sample of membrane by determining the maximum load at break. A single layer of membrane is challenged with 1 inch diameter ball while being clamped and restrained in a ring of 3 inch inside diameter. The membrane is placed taut in the ring and pressure applied against it by the steel ball of the ball burst probe. Maximum load is recorded as "Ball Burst" in pounds.

An ink was prepared as described in Example 1 using ion exchange material Type 3 to give a concentration of 0.8% platinum based on weight percent of dry ionomer solids. The as-prepared ink was passed through the Microfluidizer three consecutive times with a pressure setting of 19,000 psi. Then the solid polymer electrolyte was prepared as follows: for the first coating, a #44 Meyer Bar was used to coat onto a PEN film stretched tight over a glass plate using the prepared ink. The ePTFE membrane was then stretched over the wet coating and allowed to infiltrate. After infiltration, it was dried for 20-60 s with a hair drier. Then, a second coating using the ink solution prepared above was applied with a # 22 Meyer Bar. The second coating was then also dried with a hair drier for 20-60 s. This membrane was placed in a 160° C. air furnace for three minutes and then removed to cool. The membrane was then removed from the backer in room temperature deionized water. The measured platinum loading of this membrane was 0.017 mg/cm$^2$, and its final thickness was 20 microns.

A section of the same material was made into an MEA as described above, and assembled in a fuel cell. Testing using Test Protocol 1A showed Lifetime of 78 h and Fluoride Release Rate of $4.5 \times 10^{-8}$. This is to be compared; for example, with the Lifetimes from Example 1 of nearly an order of magnitude higher (718 h).

The mechanical properties were measured on a different section of this solid polymer electrolyte. The results (Table 6) showed that it was weaker than Examples 1, 5 and 7, having for example, a Failure Force of 106 g. This illustrates that although all the inventive materials have low fluoride release rates, the combination of a layer containing a catalyst of a supporting particle, and a strong solid polymer electrolyte are essential for long Lifetimes.

Example 3

To confirm the importance of the mechanical properties together with the composite layer comprising a catalyst on a supporting particle, another solid polymer electrolyte was prepared that had a composite layer of catalyst on supporting particle but had low mechanical properties. This was done as follows. A Type 1 ion exchange material with 0.8% Pt to dry ionomer weight was prepared using the procedures of Example 1. The drawdown bar was set to 0.025 cm (0.010 inches) and only one coating was done directly onto a glass substrate (no polymer film). No ePTFE was used. After drying, the solid polymer electrolyte was removed in room temperature water. The resulting solid polymer electrolyte was 20 to 26 microns thick.

The mechanical properties measured on a separate piece of this same material show that it is significantly weaker than those measured on the material of Ex. 1 (Table 6)

A different section of this solid polymer electrolyte was prepared into an MEA using the procedures above, assembled into a fuel cell, and tested using Test Protocol 1 A. The results show that the fluoride release rates are very low.

Comparative Example 1

A PRIMEA® series 5700 MEA with 0.4 mg Pt/cm$^2$ loading (W. L. Gore & Associates, Elkton, Md.) in each electrode was assembled into a fuel cell as described above and tested in Test Condition 1A. This MEA is reinforced with ePTFE and is the latest commercial offering (as of the date of filing) from W. L. Gore & Associates, so provides an indication of state-of-the-art performance for durable, composite membranes. There is no catalyst present in the solid polymer electrolyte of this catalyst coated membrane. The results shown in Table 2 indicate that the MEA in Example 1 using the inventive solid polymer electrolyte has nearly three times the life of the MEA of this Comparative Example, and has 1-2 orders of magnitude higher fluoride release rate than the inventive Examples 1-3.

TABLE 2

| Example No. | Lifetime (hr) | Fluoride Release Rate (g/hr · cm$^2$) |
|---|---|---|
| Ex. 1 | 718 | 1.10E−07 |
| Ex. 2. | 78 | 4.50E−08 |
| Ex. 3 | 90 | 7.10E−08 |
| Comp. Ex. 1 | 243 | 1.30E−06 |

Example 4

Another section of the solid polymer electrolyte that was prepared in Example 1 was used to prepare an MEA in the same fashion as Example 1. It was assembled into a fuel cell using the procedures described above, and tested using Test Protocol 1B. The Lifetime and Fluoride Release Rate results are shown in Table 3.

Comparative Example 2

In order to compare the inventive solid polymer electrolyte materials to those prepared previously in the prior art, a solid polymer electrolyte was prepared using a procedure similar to that used in U.S. Pat. No. 5,472,799 to Watanabe et. al. Specifically, a dispersion of unsupported platinum particles was formed in a solid polymer electrolyte by the following procedure:

1) 0.219 grams of hydrogen hexachloroplatinate (IV) hydrate salt ($H_2Cl_6Pt.H_2O$) (available from Sigma-Aldrich, St. Louis, Mo.) was dissolved in 10 grams of FLEMION® dispersion with equivalent weight of 950 (Asahi Glass Co. Ltd, Chemicals, Tokyo, JAPAN) in a 9% solid ionomer water/alcohol solution using a magnetic stir bar and a stir plate;
2) 25 cm$^3$ of water solution of sodium boron hydride (NaBH4 from Sigma-Aldrich, St. Louis, Mo.) with concentration of 0.05 M was then prepared;
3) The NaBH4 solution was titrated into the $H_2Cl_6Pt$ containing ionomer solution slowly. During the titration, platinum ions ($Pt^{4+}$) are reduced to colloidal platinum metal (Pt) particles through the reduction effect of $NaBH_4$. As this reaction proceeded further, the ion exchange solution turned to a dark color due to increasing amount of colloidal Pt particles. The relative concentration of $Pt^{4+}$ and $BH_4^-$ was monitored by measuring the electrochemical potential difference between a Pt wire working electrode and a $Hg/HgSO^4$ reference electrode emerged in the ion exchange solution. The end-point of the titration was marked by a sudden drop of the electrochemical potential;
4) After reaching the end-point, the ionomer mixture was poured out into a shallow glass dish and dried at room temperature under dry nitrogen flow;

5) The dried ionomer mixture was washed using 0.05 M, high purity sulfuric acid ($H_2SO_4$) solution to eliminate ions such as chlorine ($Cl^-$) and sodium ($Na^+$) ions;
6) After washing with acid three times, the ionomer was washed with de-ionized water three times;
7) The cleaned ionomer was dissolved into water/alcohol at room temperature using a magnetic stir bar on a stir plate to obtain a solution consisting of approximately 20% solids, 20% water and 60% alcohol. Within the ionomer solids, pure Pt colloidal particles accounted for approximately 1% by weight.
8) A solid polymer electrolyte was then prepared from this solution using a process similar to that used in Example 4. Specifically a roll of expanded polytetrafluoroethylene (ePTFE) membrane with mass per area of 7.0 g/m², a thickness of 20 microns, a porosity of at least 85%, a longitudinal matrix tensile strength of about 67 MPa, and a transverse matrix tensile strength of about 76 MPa, was prepared using the teachings of U.S. Pat. No. 3,953,566 to Gore. Then, the solution of prepared in (7) was coated onto a film paid off of a roll of PEN film at 3 feet/min using a #44 Meyer bars. The ePTFE was then applied to the wet solution, and passed through a 3 ft oven held at 150° C. in air. A second coating of the solution was made onto this material by running it through the same line at 3 feet/min using the same Meyer Bar. The final solid polymer electrolyte was 25 microns thick, and had a platinum loading in the solid polymer electrolyte of 0.016 mg/cm².

Figure 8:
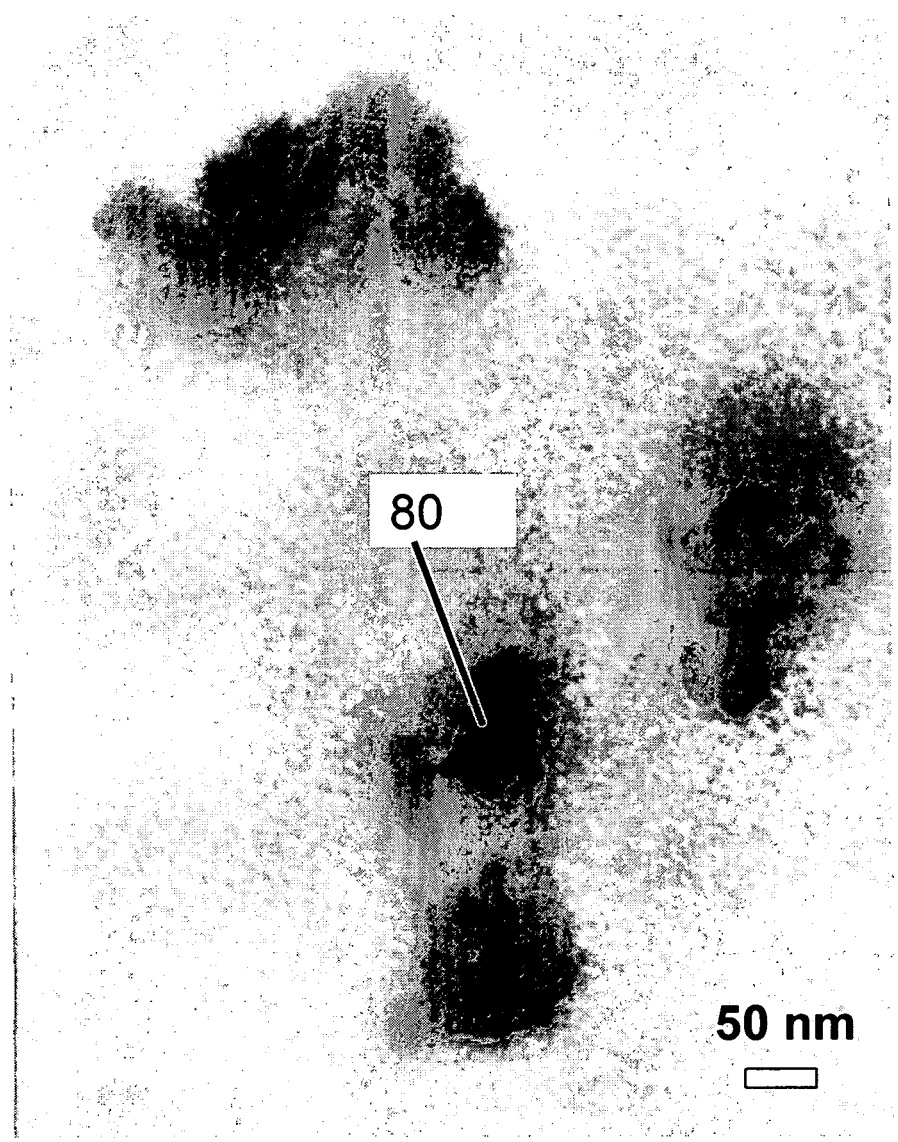
FIG. 8 is a transmission electron micrograph of the material prepared in Comparative Example 2.

A TEM micrograph of this membrane shows the presence of platinum particles 80 in FIG. 8.

This solid polymer electrolyte was used to prepare an MEA and then placed into a fuel cell using the procedures described above. It was then tested using Test Protocol 1B. The results (Table 3) indicate that the lifetimes are shorter, and the fluoride release rates are higher than the inventive membranes (Ex. 4).

Comparative Example 3

A PRIMEA® series 5700 MEA with 0.4 mg Pt/cm² loading (W. L. Gore & Associates, Elkton, Md.) in each electrode was assembled into a fuel cell as described above and tested in Test Condition 1B. This MEA is reinforced with ePTFE and is the latest commercial offering (as of the date of filing) from W. L. Gore & Associates, so provides an indication of state-of-the-art performance for durable, composite membranes. There is no catalyst present in the solid polymer electrolyte of this catalyst coated membrane. The results shown in Table 3 indicate that the MEA in Example 4 using the inventive solid polymer electrolyte has nearly twice the life of the MEA of this Comparative Example, and over seven times lower fluoride release rate.

TABLE 3

| Example No. | Lifetime (hr) | Fluoride Release Rate (g/hr · cm²) |
|---|---|---|
| Ex. 4 | 1365 | 4.30E−08 |
| Comp. Ex. 2 | 527 | 2.3E−07 |
| Comp. Ex. 3 | 700 | 1.90E−07 |

Example 5

In this example an inventive solid polymer electrolyte was prepared with platinum in a layer on only one side of the final solid polymer electrolyte. This was done as follows. First, an expanded polytetrafluoroethylene (ePTFE) membrane was prepared using the teachings of Hobson et. al. in U.S. Pat. No. 6,613,203, incorporated herein in its entirety. A membrane similar to the Type 2 ePTFE in Hobson was prepared except the processing parameters were adjusted so the mass per area was about 7.5 g/m², the thickness was 25 microns, the longitudinal matrix tensile strength was about 267 MPa (38,725 psi), the transverse matrix tensile strength was about 282 MPa (40,900 psi), the Gurley number was about 8.5 seconds, and the aspect ratio was about 29. An ink prepared as described in Example 1 was mixed with ion exchange material Type 3 to give a concentration of 2.4% platinum based on weight percent of dry ionomer solids. This solution was passed through the Microfluidizer three consecutive times with a pressure setting of 19,000 psi. Then the solid polymer electrolyte was prepared as follows: for the first coating, a #44 Meyer Bar was used to coat onto a PEN film stretched tight over a glass plate. Pure Type 3 (with no platinum in it) was used for this first coating. The ePTFE membrane was then stretched over the wet coating and allowed to infiltrate. After infiltration, it was dried for 20-60 s with a hair drier. Then, a second coating using the ink solution prepared above was applied with a #22 Meyer Bar. The second coating was then also dried with a hair drier for 20-60 s. This membrane was placed in a 160° C. air furnace for three minutes and then removed to cool. The membrane was then removed from the backer in room temperature deionized water. The measured platinum loading of this membrane was 0.022 mg/cm², and its final thickness was 18 microns. This materials was tested in a Gurley Densometer Model 4110 (Gurley Precision Instruments, Troy, N.Y.) and found to have a Gurley number greater than 10,000 s.

In this example, an MEA was prepared with a section of the solid polymer electrolyte using the procedure described in Example 1. This MEA was placed in a fuel cell using the procedures described above, so that the side with the layer containing carbon particles supporting platinum was facing the anode compartment. It was then tested using Test Protocol 1A. The Lifetime and Fluoride Release Rate results are shown in Table 4. The mechanical properties of a separate section of the solid polymer electrolyte were also obtained, with the results also shown in Table 6.

Example 6

A different section of the solid polymer electrolyte prepared in Example 5 was made into an MEA as described in Example 5 and tested in a fuel cell using Test Protocol 1A. In this Example, though, the side with the layer containing carbon particles supporting platinum was facing the cathode compartment. The lifetime and fluoride release rate results are shown in Table 4.

Comparative Example 4

In order to obtain an indication of the improvement in properties of the inventive materials of Example 5 and 6, a material made with the same reinforcement and same ionomer used in Examples 5 and 6 was prepared. A solid polymer electrolyte was prepared using the same methods described above, except only pure Type 3 ionomer was used so that no catalyst supported on a carbon layer was present. The results from testing in Test protocol 1A (Table 4) surprisingly show that the lifetime of the inventive materials was about two (Ex. 5) to over seven (Ex 6) times higher than this Comparative Example. The fluoride release rates were half (Ex. 5) to more than ten times (Ex. 6) lower than those observed in this Comparative Example.

TABLE 4

| Example No. | Lifetime (hr) | Fluoride Release Rate (g/hr · cm$^2$) |
|---|---|---|
| Ex. 5 | 523 | 3.90E−07 |
| Ex. 6 | 1677 | 3.40E−08 |
| Comp. Ex. 4 | 283 | 8.60E−07 |

Example 7

In order to show that a microporous reinforcement is not required for the inventive materials to achieve improved lifetimes, a NAFION® N101 membrane was purchased from Ion Power, Inc. (Bear, Del.). Unlike some NAFION® membranes, this material is processed in a way to make the membrane relatively strong. A layer of ion exchange materials comprising carbon supporting platinum catalyst was then laminated onto this membrane to prepare an inventive solid polymer electrolyte. The procedure was as follows: first, a solid polymer electrolyte of ion exchange material Type 3 containing ink with a platinum concentration of 2.4% was cast onto a fluoropolymer treated polyethylene terepthalate (PET) film using a #22 meyer bar. This membrane was dried at 80° C. for 5 minute and removed from the PET film at room temperature in air. It had a thickness of five microns. This layer was then laminated to the N101 membrane at 180° C. for 1 minute. The final membrane had a measured platinum content of 0.019 mg/cm$^2$ and a thickness of 30 microns. The mechanical properties of a section of this membrane were tested, and the results are shown in Table 6.

An MEA was prepared with this membrane and it was assembled into a fuel cell with the layer of carbon supporting platinum catalyst facing the cathode as described above. The results from testing in Test Protocol 1A are shown in Table 5.

Comparative Example 5

A solid polymer electrolyte was prepared using the same procedures outlined in Example 7, except the cast Type 3 membrane had no ink in it, i.e., it was pure Type 3 ion exchange material with no platinum supported on carbon in it. This cast membrane had a thickness of 5 microns after drying. After lamination to the N101 membrane, the resulting membrane had a thickness of 30 microns. This solid polymer electrolyte was tested using Test Protocal 1A and the same procedures as Example 7. The results (Table 5) show that the inventive solid polymer exchange material, Example 7, has nearly twice the lifetime, and more than three times lower fluoride release rate than Comparative Example 5.

TABLE 5

| Example No. | Lifetime (hr) | Fluoride Release Rate (g/hr · cm$^2$) |
|---|---|---|
| Ex. 7 | 138 | 1.00E−06 |
| Comp. Ex. 5 | 74 | 3.40E−06 |

TABLE 6

| Example No. | Failure Force (g) | Stiffness (g) | Strength (g/cm$^2$) | Modulus (g/cm$^2$) |
|---|---|---|---|---|
| Ex. 1 | 237 | 1911 | 2.63E+05 | 2.12E+06 |
| Ex. 3 | 106 | 1547 | 1.18E+05 | 1.72E+06 |
| Ex. 5 | 409 | 3310 | 4.54E+05 | 3.68E+06 |
| Ex. 7 | 181 | 2724 | 1.21E+05 | 1.83E+06 |
| Comp. Ex. 2 | 110 | 1772 | 9.15E+04 | 1.48E+06 |

Example 8

In order to demonstrate the utility of the inventive solid polymer electrolytes under conditions that might occur in real applications, a sample was prepared and tested in Test Protocol 2. The sample was prepared with platinum supported on carbon in layers on two sides using the general procedures of Example 1. Here, though, the expanded polytetrafluoroethylene (ePTFE) membrane was prepared using the teachings of Hobson et. al. in U.S. Pat. No. 6,613,203. A membrane similar to the Type 2 ePTFE in Hobson was prepared except the processing parameters were adjusted so the mass per area was about 7.5 g/m$^2$, the thickness was 25 microns, the longitudinal matrix tensile strength was about 267 MPa (38,725 psi), the transverse matrix tensile strength was about 282 MPa (40,900 psi), the Gurley number was between 10 and 12 seconds, and the aspect ration was about 29. The ink was prepared as described in Example 1 using ion exchange material Type 1 to give a concentration of 0.8% platinum based on weight percent of dry ionomer solids. In this example, the ink was used for both coating steps described in Example 1. In the first coating step the drawdown bar was set to 0.0965 cm (0.038 inches), while in the second, it was set to 0.0483 cm (0.019 inches). After drying the second coating with a hair dryer, the membrane was placed in a 160° C. air furnace for three minutes and then removed to cool. The membrane was then removed from the PEN film in room temperature deionized water. The measured platinum loading of this membrane was 0.015 mg/cm$^2$, and its final thickness was between 19 and 21 microns.

An MEA was prepared with a section of the solid polymer electrolyte using the procedure described in Example 1. This MEA was placed in a fuel cell using the procedures described above and tested using Test Protocol 2. The lifetime and fluoride release rate results are shown in Table 7.

Figure 9:
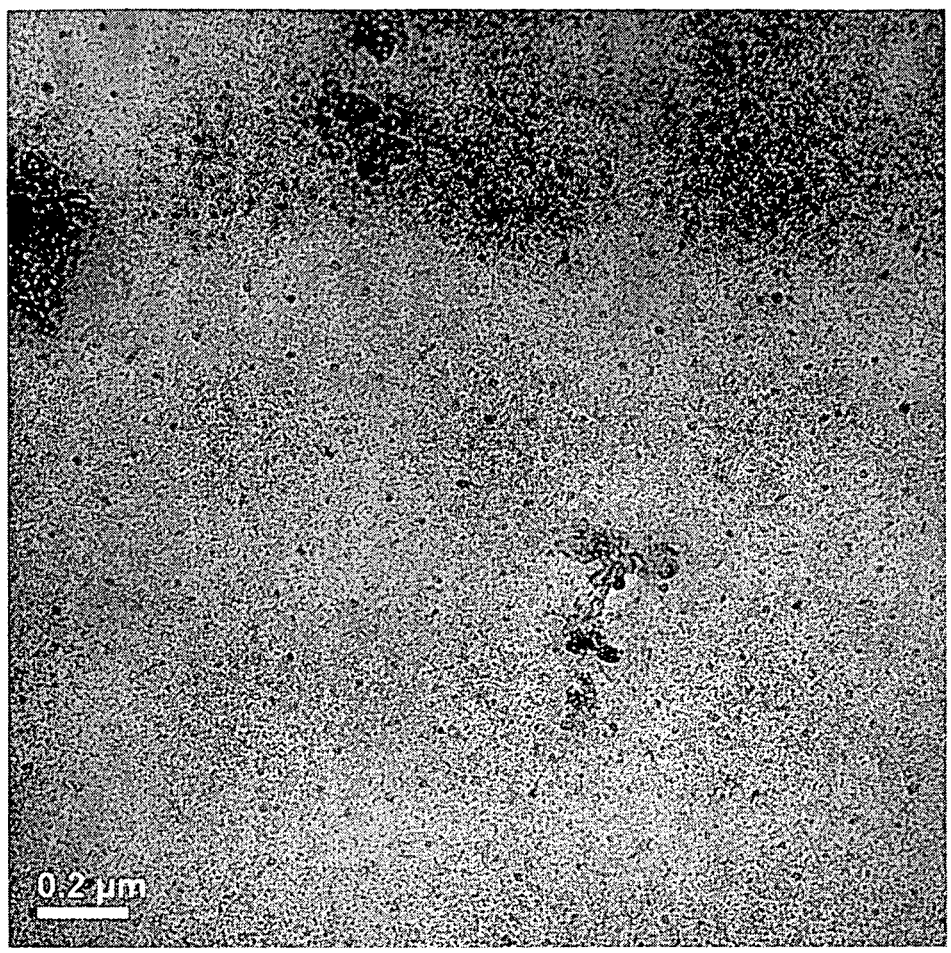
FIG. 9 is a transmission electron micrograph of a cross-section of a portion the solid polymer electrolyte prepared in Example 8.

In order to observe distribution of supported catalysts inside the membrane, transmission electron microscopy was performed on cross sections of the ion exchange membrane used in this example. A section of the solid polymer electrolyte of this example was embedded in Spurr® epoxy resin and cured at 60° C. for eight hours. The embedded sample was first trimmed with a razor blade and then thin sectioned at room temperature using a Diatome diamond knife on a Leica Ultracut UCT ultramicrotome. The microtome was set to cut 75 nm thick sections which were collected on 300 mesh copper grids. Transmission Electron Microscopy was performed using a JEM 2010 Field Emission TEM, at 200 KV at various magnifications. The results indicated that there was a plurality of very fine Pt/C particles of size less than 75 nm (FIG. 9). The interparticle spacing between these Pt/C particles was measured between 15 different pairs of particles and found to be about 115 nm on average.

Figure 10:
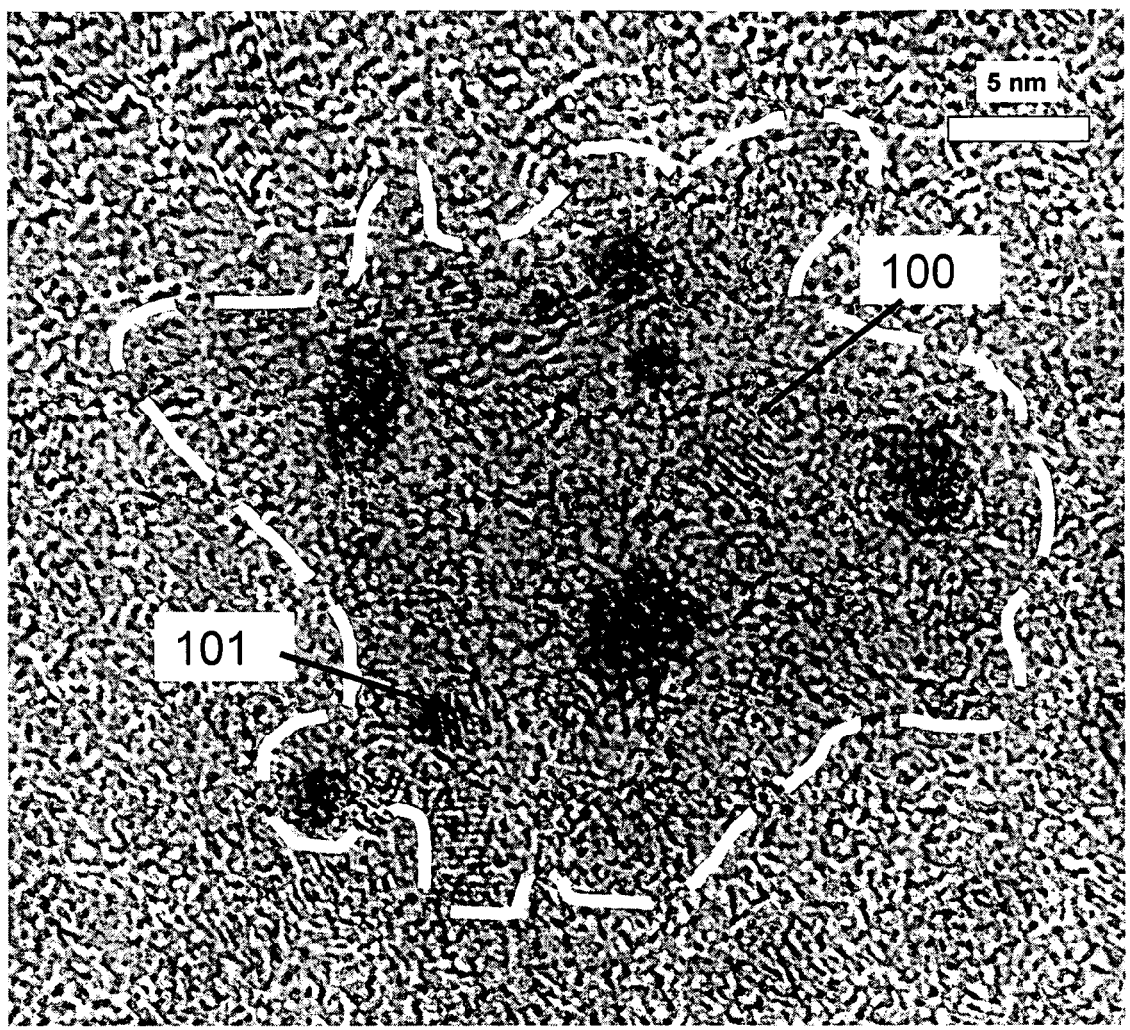
FIG. 10 is a higher magnification transmission electron micrograph of the FIG. 9.

The presence of Pt and C in these particles was confirmed at higher magnifications (FIG. 10) both by contrast, and the presence of lattice images consistent with C and Pt, 100 and 101, respectively in FIG. 9. As an aid to the eye, the dotted line in FIG. 10 has been added to show the approximate extent of a carbon particle supporting platinum. The interparticle spacing between these Pt particles was measured between 10 different pairs of Pt particles and found to be about 10 nm on average.

Examples 9-10

An additional solid polymer electrolyte was prepared using the same procedure as Example 5 except that the final step of passing the diluted ink solution through the Microfluidizer was omitted. The measured platinum loading of this SPE was 0.016 mg/cm$^2$ and its final thickness was 15-18 microns. Two MEAs were prepared with sections of the solid polymer electrolyte using the procedure described in Example 1. These MEAs were placed in a fuel cell using the procedures described above and tested using Test Protocol 2. The lifetime and fluoride release rate results are shown in Table 7.

Example 11

To confirm the surprisingly low fluoride release rates of the inventive materials, a different section of the solid polymer electrolyte prepared in Example 2 was made into an MEA using the procedures above, assembled into a fuel cell, and tested using Test Protocol 2. The fluoride release rate was very low, comparable to that observed in Example 2, which was tested in a different test protocol.

Example 12

To further confirm the surprisingly low fluoride release rate of the inventive materials, a different section of the solid polymer electrolyte prepared in Example 3 was made into an MEA using the procedures above, assembled into a fuel cell, and tested using Test Protocol 2. The fluoride release rate was again very low, comparable to that observed in Example 3, which was tested under a different test protocol.

Comparative Example 6

A sample to compare to Example 8 was prepared in this Comparative Example. The preparation procedure was similar to that used in Example 8 except that no ink was used in the preparation of the solution so there was no platinum supported on carbon in the final SPE. A # 28 meyer bar was used for the first coating (instead of the drawdown bar), a # 22 meyer bar was used for the second coating (instead of the drawdown bar), and the heat treatment after drying the second coating took place at 150° C. for 1 minute. After removing the final solid polymer electrolyte from the PEN film at room temperature in air, the thickness was measured to be 18 microns.

The resulting solid polymer electrolyte was made into an MEA as described above, and tested in a fuel cell using Test Protocol 2. The results (Table 7) show that the inventive solid polymer electrolyte of Example 11-12 have about an order of magnitude lower fluoride release rates than this Comparative Example. Further, when a strong solid polymer electrolyte is used such as in Example 8-10, the observed Lifetime was over three times longer, and the fluoride release rate an order of magnitude lower than observed for Comparative Example 6.

TABLE 7

| Example No. | Lifetime (hr) | Fluoride Release Rate (g/hr · cm$^2$) |
|---|---|---|
| Ex. 8 | 582 | 1.30E−08 |
| Ex. 9 | 637 | 8.38E−09 |
| Ex. 10 | 586 | 2.46E−08 |
| Ex. 11 | <20 | 1.80E−08 |
| Ex. 12 | <31 | 1.90E−08 |
| Comp. Ex. 6 | 184 | 1.30E−07 |

Example 13 and Comparative Example 7

The inventive materials contain a composite layer of a solid dispersion comprising a plurality of support particles supporting a catalyst comprising a precious metal catalyst and an ion exchange material. In this example, this composite layer is shown to be substantially occlusive and electronically insulating. Two samples were prepared, a composite layer of a solid dispersion of a plurality of carbon particles supporting a platinum catalyst in an ion exchange material, and the same ion exchange material without the platinum supported on carbon. These two samples were prepared using ion exchange material Type 3 using the general procedure outlined in Example 1. Here, the drawdown bar was set to 0.0254 cm (0.010 inches), the concentration of platinum in the ink was 2.4% for Example 13, and no ink was used for Comparative Example 7. Example 13 was cast on a polyethylene terephtalate film whose surface that had been treated with a fluoropolymer to enhance release, while Comparative Example 7 was cast onto a glass plate. Only one pass was made, and no microporous film was applied. Both samples were heat treated at 160° C. for 3 min. Example 13 was removed from the film at room temperature, while Comparative Example 7 was removed under room temperature water.

Figure 11:
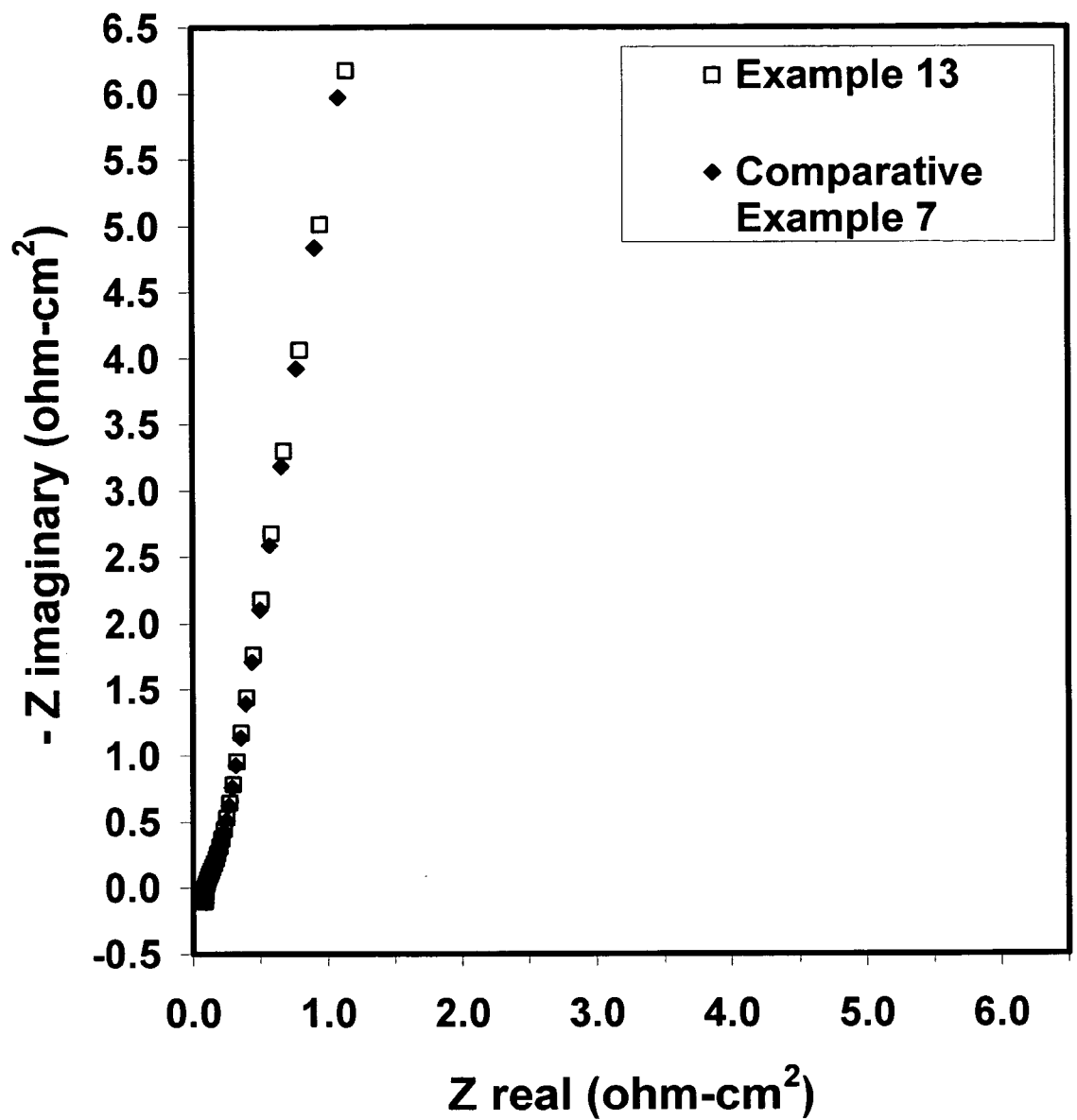
FIG. 11 is a plot of the real versus imaginary components of the test described in Example 13 and Comparative Example 7.

The catalyst-containing membrane layer, Example 13, is a physical model of a composite layer of the invention, while Comparative Example 7 is a layer without catalyst. The latter is used herein to show that the properties of the inventive composite layer are the same as a homogenous layer without the platinum supported on carbon. To characterize the electrical properties of the membrane-catalyst layer, electrochemical impedance measurements were conducted on the two membrane layers, Example 13 and Comparative Example 7: Fuel cell electrodes with a loading of 0.4 mg-Pt/cm$^2$ coated on a release layer were attached to both sides of the membranes using 15 tons of pressure at 160° C. for 3 minutes. The test was performed using the experimental procedures described by Johnson and Liu (ECS Proceedings Volume 2002-5, pages 132-141). The impedance spectra were measured at a temperature of 80° C. and a relative humidity of 88% in an atmosphere of nitrogen gas. The impedance data for a frequency range of 20.0 kHz to 2.0 Hz are shown as a Nyquist plot (the imaginary vs. the real component of the impedance) in FIG. 11.

The impedance spectra for the two membranes are nearly identical, indicating the membranes have essentially the same electrical properties. Furthermore, these spectra are characteristic of ionically conductive membranes that are electronic insulators, i.e., there are not adequate pathways for electrons to pass through the membrane. Therefore, the composite layer of a solid dispersion comprising a plurality of support particles supporting a catalyst comprising a precious metal catalyst and an ion exchange material layer of the invention is an electronic insulator.

A separate cast material prepared identically to that described above for Example 13 was tested using a standard Gurley air flow test. It had a Gurley value of greater than 10,000 s indicative of a substantially occlusive material. These tests taken together thus demonstrate that the composite layer comprising a plurality of carbon particles supporting a catalyst comprising platinum and an ion exchange material used in the inventive solid polymer electrolyte is both substantially occlusive and electronically insulating.

Example 14

An additional inventive solid polymer electrolyte was prepared using the procedures of Example 5 except the Type 3 ion exchange material was mixed with ink to produce a solution that was 11.5% platinum weight to dry ionomer (instead of 2.4% used in Example 5). This solution was not passed through the Microfluidizer, but instead, a portion of it was placed in a 25 ml centrifuge tube, and subsequently centrifuged in an Adams Compact II Centrifuge (Beckton-Dickenson Inc., Franklin Lakes, N.J.) for about 20 min at 3200 rpm. After centrifuging, the supernatant was used to prepare a solid polymer electrolyte as described in Example 5. The final membrane had a very light grey color, a thickness of 15-18 microns, and a measured platinum loading below the detection limit of the XRF (<0.001 mg/cm$^2$).

Although several exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

We claim:

1. A solid polymer electrolyte membrane having a first surface and a second surface opposite said first surface, said solid polymer electrolyte membrane having a failure force greater than about 115 grams and comprising a composite membrane consisting essentially of (a) at least one expanded PTFE membrane having a porous microstructure of polymeric fibrils, (b) at least one ion exchange material, wherein said porous microstructure of the expanded PTFE membrane is disposed within and impregnated by said ion exchange material so as to render an interior volume of the expanded PTFE membrane substantially occlusive; and (c) a plurality of first carbon particles supporting a catalyst comprising platinum dispersed within said ion exchange material between said expanded PTFE membrane and said first surface to form a substantially occlusive, electronically insulating first composite layer, wherein a plurality of said first carbon particles has a particle size less than about 75 nm.

2. A solid polymer electrolyte of claim 1 wherein at least one substantially occlusive, electronically insulating second layer is interposed between the expanded PTFE membrane and one of the group consisting of said first surface, said second surface and a surface of said substantially occlusive, electronically insulating first composite layer, said substantially occlusive, electronically insulating second layer selected from the group of an ion exchange material, and a solid dispersion comprising an ion exchange material and a plurality of second carbon particles supporting a catalyst comprising platinum, wherein a plurality of said second carbon particles has a particle size less than about 75 nm.

3. The solid polymer electrolyte of claim 1 wherein a plurality of said first and second carbon particles supporting a catalyst are less than about 50 nm in size.

4. The solid polymer electrolyte of claim 3 wherein a plurality of said first and said second carbon particles supporting a catalyst are less than about 25 nm in size.

5. A catalyst coated membrane comprising
  (a) an anode comprising a catalyst for oxidizing fuel,
  (b) a cathode comprising a catalyst for reducing an oxidant,
  (c) a solid polymer electrolyte interposed between said anode and said cathode,
  where said solid polymer electrolyte comprises the solid polymer electrolyte of claim 1.

6. A fuel cell comprising the catalyst coated membrane of claim 5 wherein sufficient fuel is supplied to said anode and sufficient oxidant is supplied to said cathode to establish a voltage between said anode and said cathode when said anode and said cathode are electrically connected through an external load.

* * * * *